(12) United States Patent
Okouchi et al.

(10) Patent No.: US 10,207,399 B2
(45) Date of Patent: Feb. 19, 2019

(54) ELECTRIC TOOLS

(71) Applicant: MAKITA CORPORATION, Anjo-shi, Aichi (JP)

(72) Inventors: Katsumi Okouchi, Anjo (JP); Yohei Ogino, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 1 day.

(21) Appl. No.: 15/581,463

(22) Filed: Apr. 28, 2017

(65) Prior Publication Data

US 2017/0225315 A1    Aug. 10, 2017

Related U.S. Application Data

(63) Continuation of application No. 13/960,307, filed on Aug. 6, 2013, now Pat. No. 9,669,534.

(30) Foreign Application Priority Data

Aug. 17, 2012 (JP) ................................ 2012-181191
Aug. 17, 2012 (JP) ................................ 2012-181194

(51) Int. Cl.
*B25F 5/02* (2006.01)
*B25F 5/00* (2006.01)
*B23Q 11/00* (2006.01)
*B27C 5/10* (2006.01)

(52) U.S. Cl.
CPC ............ *B25F 5/008* (2013.01); *B23Q 11/005* (2013.01); *B25F 5/02* (2013.01); *B27C 5/10* (2013.01)

(58) Field of Classification Search
CPC .......... B25F 5/008; B25F 5/02; B23Q 11/005; B27C 5/10
USPC ......................................................... 173/217
See application file for complete search history.

(56) References Cited

U.S. PATENT DOCUMENTS 1,423,511 A * 7/1922 Baker ................. B23Q 11/005
 144/252.1
5,902,080 A   5/1999 Kopras
5,918,685 A   7/1999 Ulbrich et al.
(Continued)

FOREIGN PATENT DOCUMENTS

CN   1534705 A   10/2004
CN   1636680 A   7/2005
(Continued)

OTHER PUBLICATIONS

May 29, 2015 Office Action issued in Chinese Patent Application No. 201310361758.3.

(Continued)

*Primary Examiner* — Michelle Lopez
(74) *Attorney, Agent, or Firm* — Oliff PLC

(57) ABSTRACT

An electric tool may include a tubular housing, a motor disposed within the housing, and a tool holder rotatably driven by the motor and capable of holding an end tool. A shoe may be supported by the housing and may determine a protruding length of the end tool from one end of the housing. A battery mount portion may be disposed at the other end of the housing. The battery may be mounted to the battery mount portion as the battery is slid relative to the battery mount portion along a direction intersecting the extending direction of the housing.

10 Claims, 31 Drawing Sheets

(56) References Cited

U.S. PATENT DOCUMENTS

| | | | |
|---|---|---|---|
| 6,350,087 B1* | 2/2002 | Berry | B23B 31/001 144/154.5 |
| 6,536,537 B1 | 3/2003 | Sasaki et al. | |
| 2002/0090274 A1 | 7/2002 | Berry et al. | |
| 2004/0149553 A1 | 8/2004 | Duffek et al. | |
| 2005/0225183 A1* | 10/2005 | Braun | B24B 23/028 310/50 |
| 2006/0151189 A1 | 7/2006 | Wu | |
| 2009/0126961 A1 | 5/2009 | Miyazawa et al. | |

FOREIGN PATENT DOCUMENTS

| | | |
|---|---|---|
| CN | 102430804 A | 5/2012 |
| JP | 2000-246657 A | 9/2000 |
| JP | 2002-066816 A | 3/2002 |
| JP | 2005-046970 A | 2/2005 |
| JP | 2005-193343 A | 7/2005 |
| JP | 2005-238533 A | 9/2005 |
| JP | 2008-154405 A | 7/2008 |
| JP | 2009-125813 A | 6/2009 |
| JP | 2009-184072 A | 8/2009 |
| JP | 2012-045646 A | 3/2012 |
| JP | 2012-051046 A | 3/2012 |
| WO | 2010/092885 A1 | 8/2010 |

OTHER PUBLICATIONS

Nov. 4, 2015 Office Action issued in Japanese Patent Application No. 2012-181191.
Nov. 4, 2015 Office Action issued in Japanese Patent Application No. 2012-181194.
Mar. 15, 2016 Office Action issued in Japanese Patent Application No. 2012-181191.
May 16, 2016 Office Action Issued in U.S Appl. No. 13/960,307.
Oct. 14, 2016 Office Action issued in U.S. Appl. No. 13/960,307.
Makita Corporation. "Cutout Tool Model 3706". Instruction Manual, Feb. 2006.

* cited by examiner

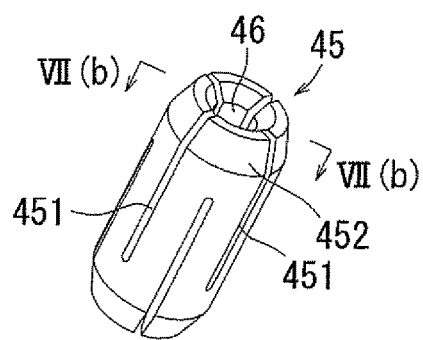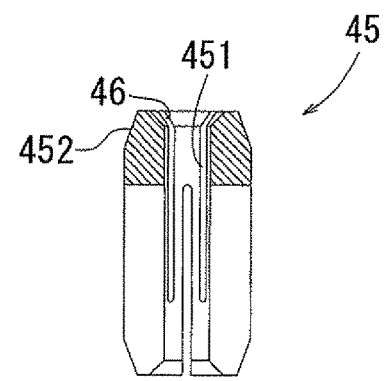
FIG. 7(a)         FIG. 7(b)
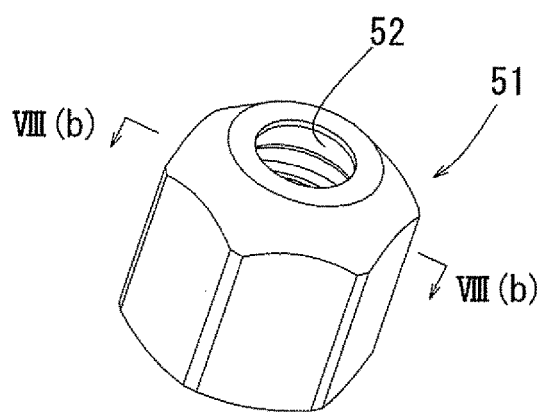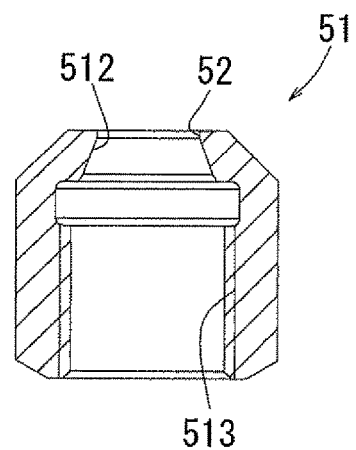
FIG. 8(a)         FIG. 8(b)

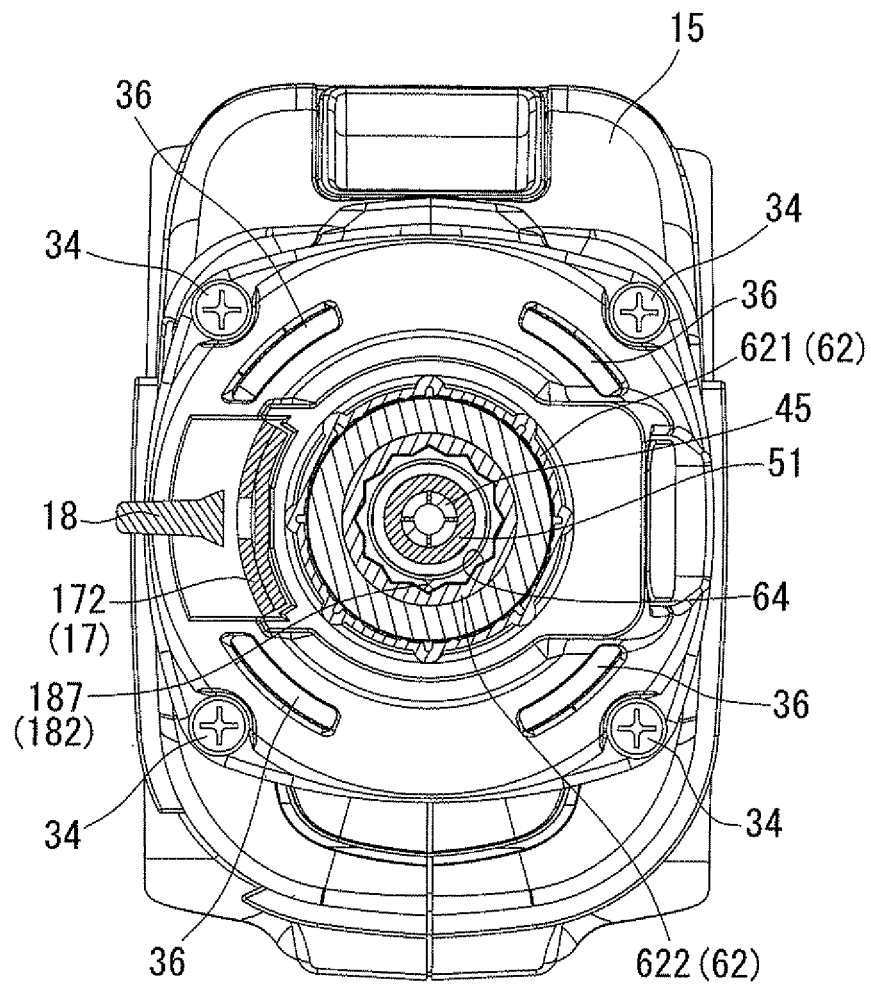
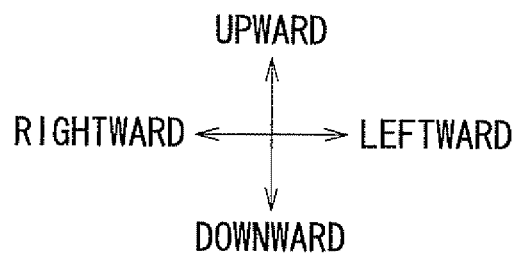
FIG. 17

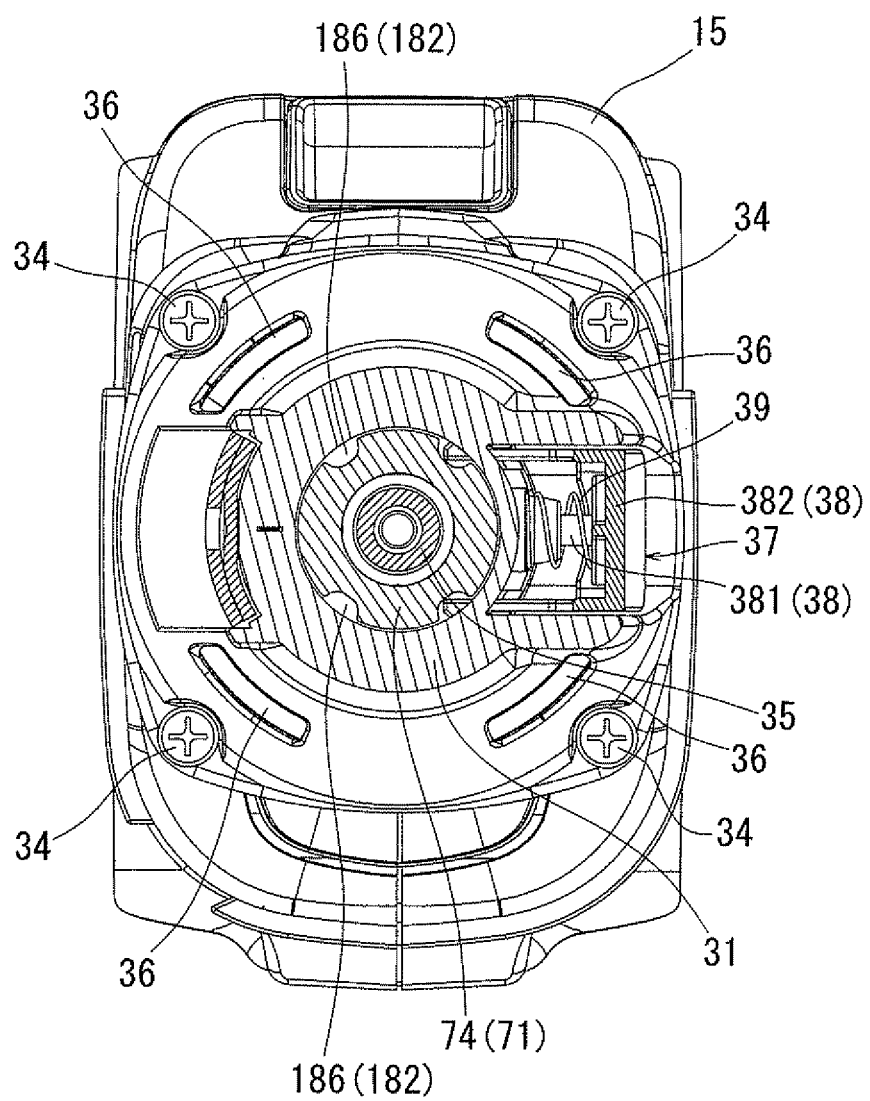
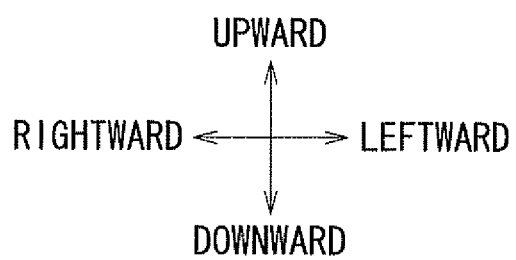
FIG. 18

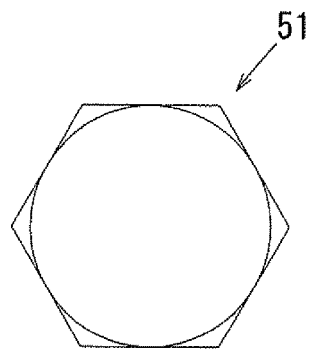
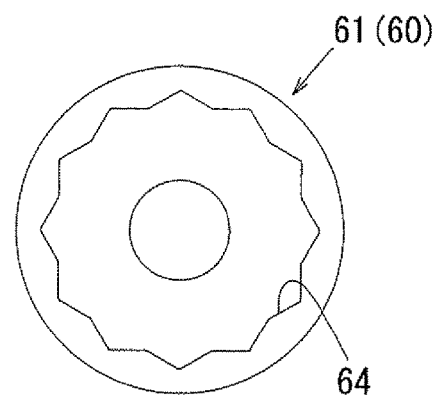
FIG. 20 (a)　　　　　　　　FIG. 20 (b)
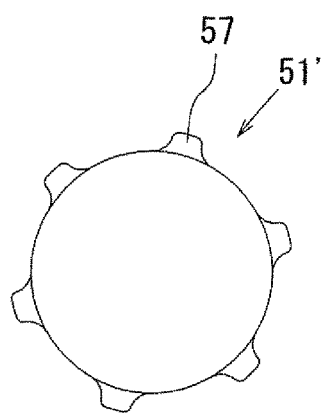
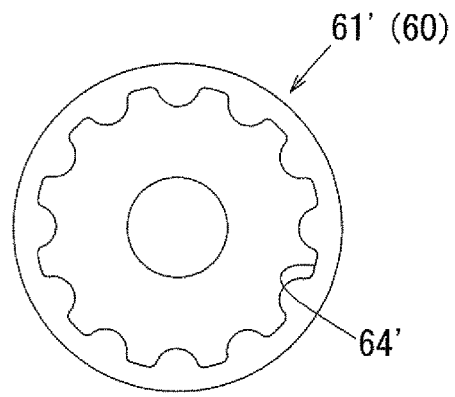
FIG. 21 (a)　　　　　　　　FIG. 21 (b)

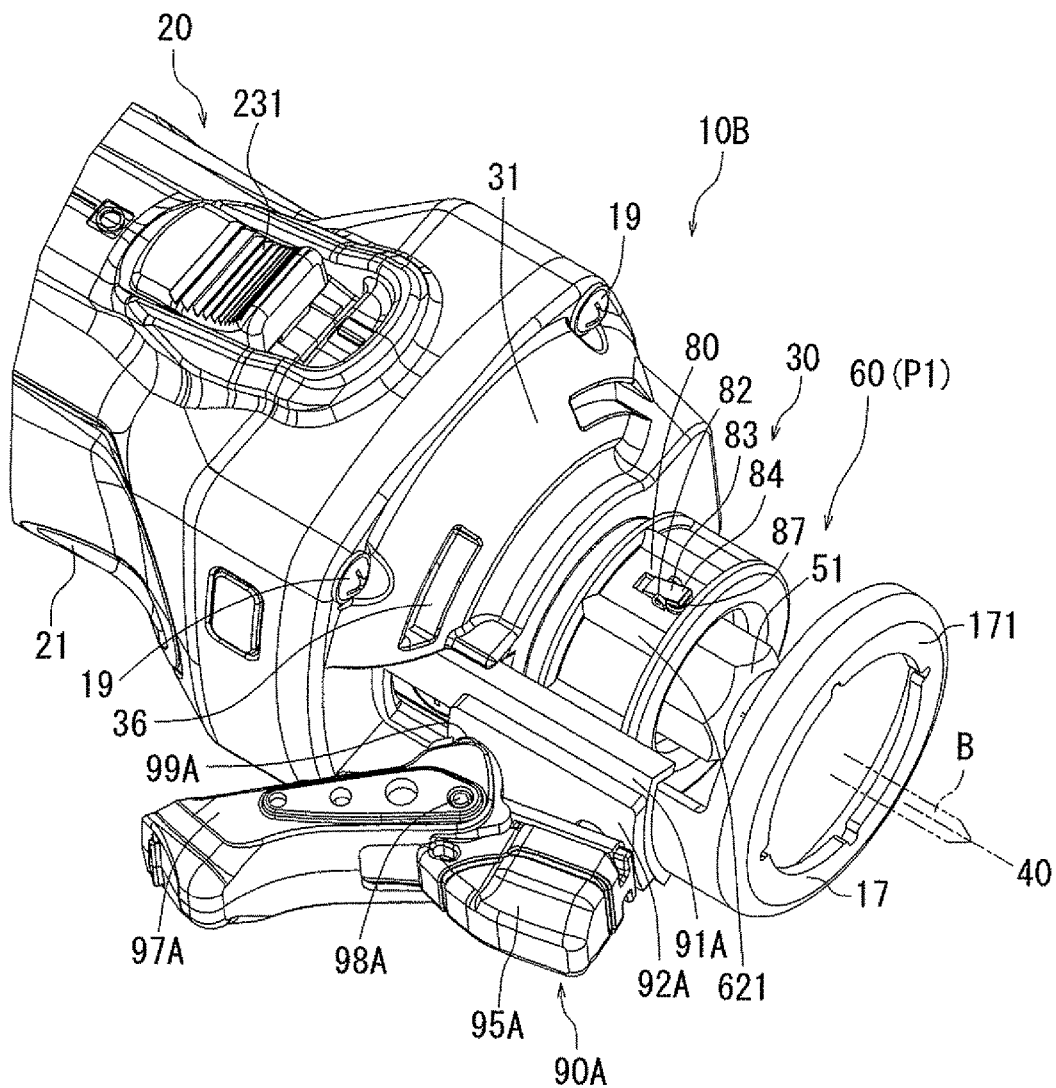
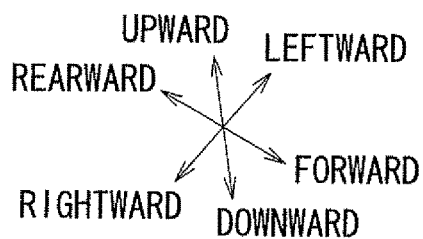
FIG. 34

ELECTRIC TOOLS

This is a Continuation of U.S. application Ser. No. 13/960,307 filed Aug. 6, 2013, now U.S. Pat. No. 9,669,534, which claims the benefit of Japanese Application No. 2012-181191 filed Aug. 17, 2012 and Japanese Application No. 2012-181194 filed Aug. 17, 2012. The disclosures of the prior applications are hereby incorporated by reference herein in their entireties.

BACKGROUND OF THE INVENTION

Field of the Invention

Embodiments of the present invention relate to electric tools to which end tools can be mounted so as to be rotatably driven for machining workpieces.

Description of the Related Art

Electric rotary tools called dust-proof board trimmers or cut-out tools are known. Such electric rotary tools may be used for various machining operations, such as cut-out operations for cutting plaster boards or the like. For example, this type of electric tool is disclosed in "INSTRUCTION MANUAL DUST-PROOF BOARD TRIMMER MODEL 3706" published by Makita Corporation in February 2006. This type of electric tool may include a drive motor for generating a rotational drive force and an output spindle (output shaft) that is rotatably driven by the rotational drive force of the drive motor. A mount mechanism may be disposed at the front end of the output spindle for mounting a machining bit (end tool). A bit selected according to the machining operation, such as a cut-out operation described above, to be performed, may be mounted to the mount mechanism. The mount mechanism may allow replacement of various bits. The replacement operation of the bit may be made by using a dedicated tool, such as a spanner, operable to loosen and fasten the mount mechanism.

In this kind of electric rotary tool, a shoe protruding from the electric rotary tool may be provided for determining a protruding distance of the bit mounted to the mount mechanism. In general, the shoe may be mounted to a housing of the electric rotary tool so as to be movable relative thereto. In addition, a rechargeable battery may be attached to the electric rotary tool for supplying an electric power to the drive motor. Therefore, a battery mount portion may be provided on the electric rotary tool for mounting the battery.

There has been a need in the art for further improving this kind of electric tool.

SUMMARY OF THE INVENTION

In one aspect according to the present teachings, an electric tool may include a tubular housing extending along a first direction, a motor disposed within the housing, and a tool holder capable of being rotatably driven by the motor. The tool holder may hold an end tool, so that the end tool protrudes outside from a first end of the housing. A shoe may be supported by the housing and may be configured to determine a protruding length of the end tool held by the tool holder. A battery mount portion may be disposed at a second end opposite to the first end of the housing. The battery may be mounted to the battery mount portion as the battery is slid along a second direction relative to the battery mount portion. The second direction may intersect the first direction.

In this way, the battery may be mounted to the battery mount portion by sliding the battery along the second direction that intersects the first direction, along which the tubular housing extends. Therefore, for example, in the case that the electric tool is positioned such that the tubular housing extends in the horizontal direction, the battery may be mounted to the battery mount portion by sliding the battery along the battery mount portion in a direction intersecting the horizontal direction. Hence, the mounting operation of the battery can be easily performed, and eventually, the operability of the electric tool can be improved.

The shoe may be movable in the first direction for changing the position relative to the housing. Therefore, the shoe may be configured to extend in the same direction as the extending direction of the housing. Hence, it may be possible to configure the electric tool to have a relatively small thickness at the region of the shoe. As a result, the electric tool may be improved in its operability also in this respect.

The electric tool may further include a lock device and a shoe fixing device. The lock device may prevent rotation of the tool holder relative to the housing. The shoe fixing device may fix the shoe in position relative to the housing. The lock device and the shoe fixing device may be arranged at positions symmetrical with each other with respect to a central axis of the housing. The central axis of the housing may extend along the first direction.

With this arrangement, it is possible to reduce the size in the first direction of the electric tool at the region around the shaft lock mechanism and the shoe fixing device. Hence, it is possible to reduce the length of the electric tool. As a result, the electric tool may be improved in its operability also in this respect.

The lock device and the shoe fixing device may be arranged along a third direction that intersects both the first direction and the second direction. With this arrangement, the shaft lock mechanism and the shoe fixing device may be efficiently three-dimensionally arranged. Hence, it is possible to reduce the size of the electric tool at the region around the shaft lock mechanism and the shoe fixing device.

In another aspect according to the present teachings, an electric tool may include a tubular housing extending along a first direction, a motor disposed within the housing, and a tool holder capable of being rotatably driven by the motor. The tool holder may hold an end tool, so that the end tool protrudes outside from a first end of the housing. A shoe may be supported by the housing and may be configured to determine a protruding length of the end tool held by the tool holder. The shoe may be movable in the first direction for changing the position relative to the housing. The electric tool may further include a shoe fixing device configured to fix the shoe in position relative to the housing by a single operation.

With this arrangement, the operation for fixing the position of the shoe after determining the position of the shoe can be performed by a single operation (one-touch operation). Therefore, the fixing operation of the shoe can be easily performed. The electric tool may be improved in operability in this respect.

In a further aspect of the present teachings, an electric tool may include a tubular housing extending along a first direction, a motor disposed within the housing, and a tool holder capable of being rotatably driven by the motor. The tool holder may hold an end tool, so that the end tool protrudes outside from a first end of the housing. A shoe may be supported by the housing and may be configured to determine a protruding length of the end tool held by the tool holder. The electric tool may further include a lock device, a shoe fixing device and an operation input device. The lock device may prevent rotation of the tool holder relative to the housing. The shoe fixing device may fix the shoe in position relative to the housing. The lock device and the shoe fixing device may be arranged at positions symmetrical with each other with respect to a central axis of the housing. The central axis of the housing may extend along the first direction. The electric tool may further include an operation input device configured to allow an input operation relating to the rotational drive of the motor. The operation input device may be disposed at a position along a direction intersecting a direction along which the lock device and the shoe fixing device are arranged.

With the arrangement of the lock device and the shoe fixing device at positions symmetrical with each other with respect to the central axis of the housing extending along the first direction, it is possible to minimize the length in the first direction of a space that may be necessary for the lock device and the shoe fixing device. Therefore, the length of the electric tool can be minimized. The electric tool may be improved in operability also in this respect. In addition, with the arrangement of the operation input device at the position along the direction intersecting the direction along which the lock device and the shoe fixing device are arranged, the operation input device can be efficiently arranged without affecting to the necessary space for the lock device and the shoe fixing device. As a result, it is possible to efficiently arrange the operation input device, the lock device and the shoe fixing device with respect to the housing.

In a still further aspect of the present teachings, the electric tool may include a motor for generating a rotational drive force, an output shaft rotatably driven by the rotational drive force of the motor, and a tool holder disposed at a front portion of the output shaft and configured to hold an end tool. The electric tool may further include an adjustment base capable of adjusting a machining range of the end tool, and a support housing configured to support the output shaft. An air flow passage may be defined in the support housing, so that air can flow in an axial direction along the air flow passage.

With this arrangement, air may flow in the axial direction along the air flow passage defined in the support housing. Therefore, it is possible to direct air toward various components, whose positions may be determined with respect to the position of the output shaft. Hence, it may be possible to blow off the dust from these components before the dust falls on these components. In addition, because the dust may be blown in the axial direction of the output shaft, it may be possible to prevent the dust from accumulation within the support housing.

The air may be directed toward the tool holder or may flow to be applied to the tool holder. With this arrangement, it may be possible to blow off the dust from the tool holder before the dust falls on the tool holder. Therefore, it may be possible to ensure the proper operation of the tool holder.

The air flow passage may be defined between an outer circumferential surface of the output shaft and an inner circumferential surface of the support housing. With this arrangement, it may be possible to more reliably prevent the dust from accumulation within the housing.

The electric tool may further include an operation mechanism for operating the tool holder, and the air may be directed toward the operation mechanism. With this arrangement, it may be possible to blow off the dust from the operation mechanism before the dust falls on the operation mechanism. Therefore, it may be possible to ensure the proper operation of the operation mechanism.

The electric tool may further include a discharge opening provided at a front portion of the support housing, and the air may flow from the discharge opening in at least a direction forwardly along the axial direction of the output shaft.

With this arrangement, it may be possible to efficiently blow off the dust from a region on the front side of the support housing, where the dust is prone to be produced. Therefore, the produced dust may be prevented from accumulation. As a result, it is possible to reduce an uncomfortable feeling given to the operator by the dust. Eventually, the operator can comfortably use the electric tool.

The air may be directed to flow toward a side of an outer circumference of the adjustment base. Because the air may flow through points around the outer circumference of the adjustment base, the dust produced during the use of the electric tool may be blown toward the outer circumferential side of the adjustment base. Hence, the dust may not be flown toward the operator. As a result, it is possible to reduce an uncomfortable feeling given to the operator by the dust. Eventually, the operator can comfortably use the electric tool also in this respect.

BRIEF DESCRIPTION OF THE DRAWINGS

FIG. 7(a) is a perspective view of an insert shown in FIGS. 5 and 6;

FIG. 7(b) is a sectional view of the insert taken along line VII(b)-VII(b) in FIG. 7(a);

FIG. 8(a) is a perspective view of a nut shown in FIGS. 5 and 6;

FIG. 8(b) is a sectional view of the nut taken along line VIII(b)-VIII(b) in FIG. 8(a);

FIG. 17 is a sectional view taken along line XVII-XVII in FIG. 2;

FIG. 18 is a sectional view taken along line XVIII-XVIII in FIG. 2;

FIGS. 20(a) and 20(b) show front views of a nut and an engaging member, respectively, according to a first example;

FIGS. 21(a) and 21(b) show front views of a nut and an engaging member, respectively, according to a second example;

FIG. 34 is a view similar to FIG. 31 but showing the state where the fixation of the shoe has been released.

DETAILED DESCRIPTION OF THE INVENTION

Each of the additional features and teachings disclosed above and below may be utilized separately or in conjunction with other features and teachings to provide improved electric tools. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful examples of the present teachings. Various examples will now be described with reference to the drawings.

Embodiments will now be described with reference to the drawings, in which three different embodiments are shown. Electric tools of these embodiments are those called cut-out tools that can be used for machining operations, such as a cut-out operation, of plaster boards.

<First Embodiment>

Figure 1:
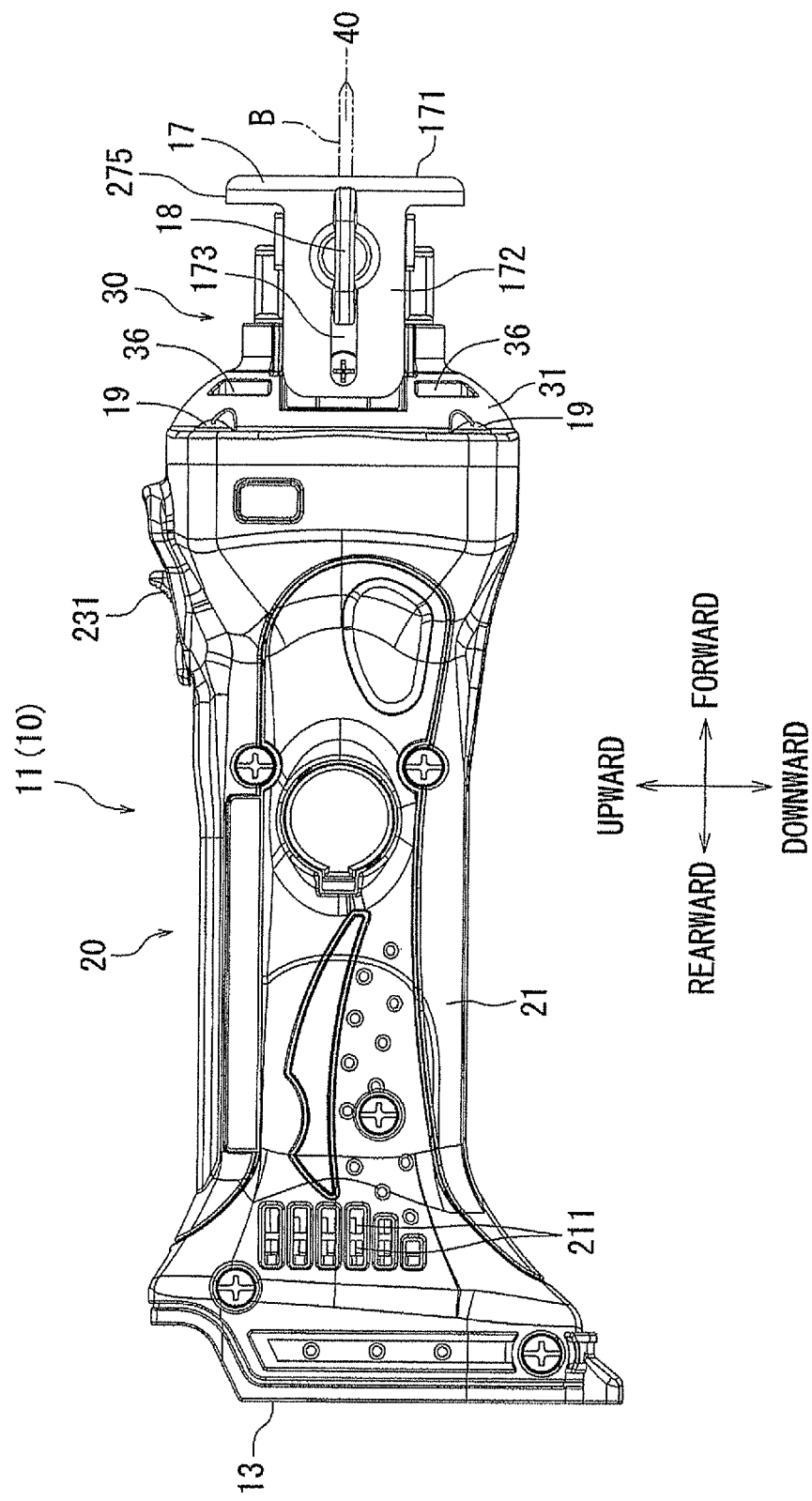
FIG. 1 is a side view of an electric tool according to a first embodiment of the present invention.
Figure 2:
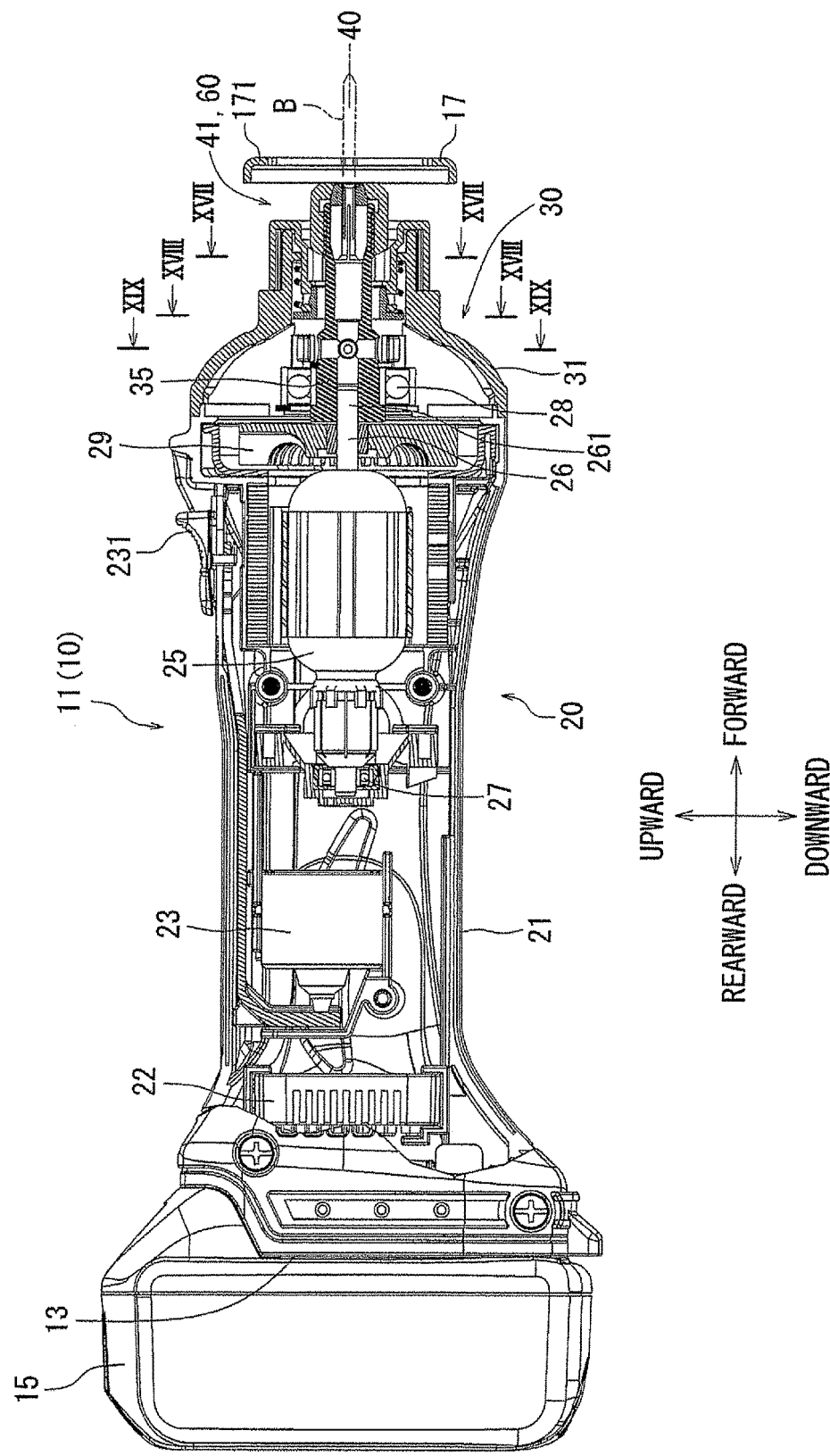
FIG. 2 is a vertical sectional view of the electric tool showing the internal structure of the electric tool.

An electric tool 10 according to a first embodiment will now be described with reference to FIGS. 1 to 7. For the purpose of illustration, the upward, downward, forward, reward, leftward and rightward directions with respect to the electric tool 10 are determined as shown in these figures. In FIG. 1, the electric tool 10 is shown in the state where a rechargeable battery 15 has been removed from a tool main body 11. The electric tool 10 may be designed as a hand-held type one that can be held by a hand or hands of the operator during the use.

Referring to FIGS. 1 to 4, the electric tool 10 may generally include the tool main body 11, the rechargeable battery 15 and a shoe 17. The tool main body 11 may have a tubular housing including a motor housing 21 serving as a housing of a drive section 20, and a front housing 31 serving as a housing of an output section 30. Each of the motor housing 21 and the front housing 31 may have a tubular shape and may extend in a forward and rearward direction. A motor 25 with brushes may be disposed within the motor housing 21. In the following description, the forward and rearward direction, the upward and downward direction (vertical direction) and the left and right direction with respect to the electric tool 10 will be also called a first direction, a second direction and a third direction, respectively. Therefore, the motor housing 21 may extend in the first direction. The second direction may intersect the first direction. The third direction may intersect both the first and second directions.

The rechargeable battery 15 may be mounted to the tool unit body 11 and may serve as a power source. When the rechargeable battery 15 has been discharged as a result of use, a dedicated battery charger (not shown) can recharge the rechargeable battery 15. The tool may body 11 has a battery mount portion 13 at its rear end. The rechargeable battery 15 can be mounted to the battery mount portion 13 as it is slid substantially in the upward and downward direction along the battery mount portion 13. In this way, the rechargeable battery 15 can be mounted to the battery mount portion 13 as it is slid in the vertical direction that intersects the forward and rearward direction (i.e., the first direction).

The shoe 17 is positioned at a position forwardly of the front end of the output spindle 35. By determining the position of the shoe 17 relative to the tool unit body 11, a protruding length (protruding distance) of a tool bit B from the shoe 17 can be determined. More specifically, the position of the shoe 17 can determine the protruding length of the tool bit B that is mounted to a bit mount mechanism 41. The protruding length of the tool bit B may relate to a range of the tool bit B used for the machining operation. For this reason, the shoe 17 is disposed at the front end of the tool main body 11 and is supported by the front housing 31.

The shoe 17 may include a shoe body 171 and a mount portion 172. The shoe body 171 is positioned to oppose to a workpiece. The mount portion 172 is mounted to the tool main body 11 by means of a finger screw 18. The shoe body 171 serves as an adjustment base as will be explained later. The show body 171 extends in a direction intersecting the extending direction of the mount portion 172. The mount portion 172 may include an elongated slot 173 elongated in the forward and rearward direction. The mount portion 172 may slide under the guide of a guide member 174 that is fixed in position relative to the front housing 31. More specifically, the guide member 174 may be fixed to the front housing 31 by means of screws. Guide ribs 175 may be formed on the guide member 174 and may guide the mount portion 172 to allow the sliding movement of the mount portion 172 in the forward and rearward direction. In this way, the shoe 17 is configured to be able to change its position relative to the front housing 31 as it moves in the forward and rearward direction.

The shoe 17 can be slid in the forward and rearward direction relative to the tool main body 11 to a suitable position, where the shoe 17 may be fixed in position by using the finger screw 18. More specifically, as the finger screw 18 is rotated in a tightening direction, the mount portion 172 of the shoe 17 may be pressed against the guide member 174, so that the mount portion 172 of the shoe 17 may be fixed in position relative to the guide member 174 by the finger screw 18. In this way, the shoe 17 can be fixed in position relative to the tool main body 11. Therefore, the finger screw 18 serves as a shoe fixing device for fixing the shoe 17 in position. The position fixing operation of the shoe 17 may be performed after the position of the shoe 17 is adjusted relative to the tool main body 11 having the motor housing 12.

The tool bit B that may be mounted to the bit mount mechanism 41 may protrude forwardly from the shoe 17. The position of the shoe 17 can be adjusted as described above. The protruding length of the tool bit B may be determined according to the position of the shoe 17. As described above, the tool bit B serves as an end tool. In this embodiment, the position adjusting direction (forward and rearward direction) of the shoe 17 perpendicularly intersects the mounting direction (vertical direction) of the rechargeable battery 15.

The tool main body 11 will now be described. The tool main body 11 may be generally divided into the drive section 20 and the output section 30. The drive section 20 mainly serves to generate a drive force. The output section 30 serves to support the output spindle 35 that is rotatably driven. The drive section 20 extends over the rear portion and the intermediate portion of the tool main body 11 and may convert the electric power to the rotational drive force. The drive section 20 includes the motor housing 21 and also includes various components disposed in the motor housing 21. The motor housing 21 has left and right halves each formed by a molding process. The battery mount portion 13 is positioned at the rear end of the motor housing 21. Within the motor housing 21, a controller 22, a switch 23, the motor 25 and a fan 29 may be disposed and arranged in this order in the forward direction. The controller 22 may control the supply of electric power from the rechargeable battery 15. The switch 23 may receive an operation input from a slide switch 231. The slide switch 231 is exposed to the outside of the motor housing 21 and can be slid in forward and rearward directions. More specifically, the slide switch 231 is elongated in the forward and rearward direction. As the operator shifts the slide switch 231 in the forward direction, the rear end surface of the slide switch 231 moves the rear end of an operation element (not shown) coupled to the switch 23, so that an on operation input can be made for turning on the switch 23. The slide switch 231 serves as an operation input device that provides an operation input relating to the rotary drive of the motor 25. The slide switch 231 is disposed at the upper portion of the motor housing 21. In other words, the slide switch 231 is disposed at the upper portion in the vertical direction of the motor housing 21. The vertical direction with respect to the motor housing 21 intersects the left and right direction.

The motor 25 may have a construction that is generally used for known motors having brushes. The motor 25 has a motor shaft 26 that is driven to rotate. A rear bearing 27 and a front bearing 28 rotatably support the motor shaft 26. The tool bit B may be mounted to the output spindle 35 that is coupled to the front portion of the motor shaft 26. The motor housing 21 support the rear bearing 27. The front housing 31 supports the front bearing 28.

The fan 29 is mounted to the motor shaft 26. The fan 29 may be a centrifugal fan. As the fan 29 rotates, the air may flow in the forward direction within the motor housing 21. The flow of air produced by the fan 29 serves as a motor cooling air that may mainly cool the controller 22, the switch 23 and the motor 25 in this order. More specifically, the air may be introduced into the motor housing 21 via air inlet openings 211 formed in the rear portion of the motor housing 21. The air may then flow through the controller 22, the switch 23 and the brush motor 25 for cooling them in this order. Thereafter, the air may flow through the fan 29 to enter inside of the front housing 31. After entering inside of the front housing 31, the air may be blown out of the front housing 31 via air-blow openings 36 disposed at the front portion of the electric tool 10 as will be explained later, so that the air can be discharged to the outside. In this way, in this embodiment, an air flow passage is formed for the flow of air, so that the air is introduced into the tool man body 11 via the inlet openings 211 and is thereafter discharged to the outside via the air-blow openings 36 by the operation of the fan 29. The motor cooling air may be also called a discharge air. The air-blow openings 36 serve as a discharge opening provided at the front portion of the front housing 31.

Figure 5:
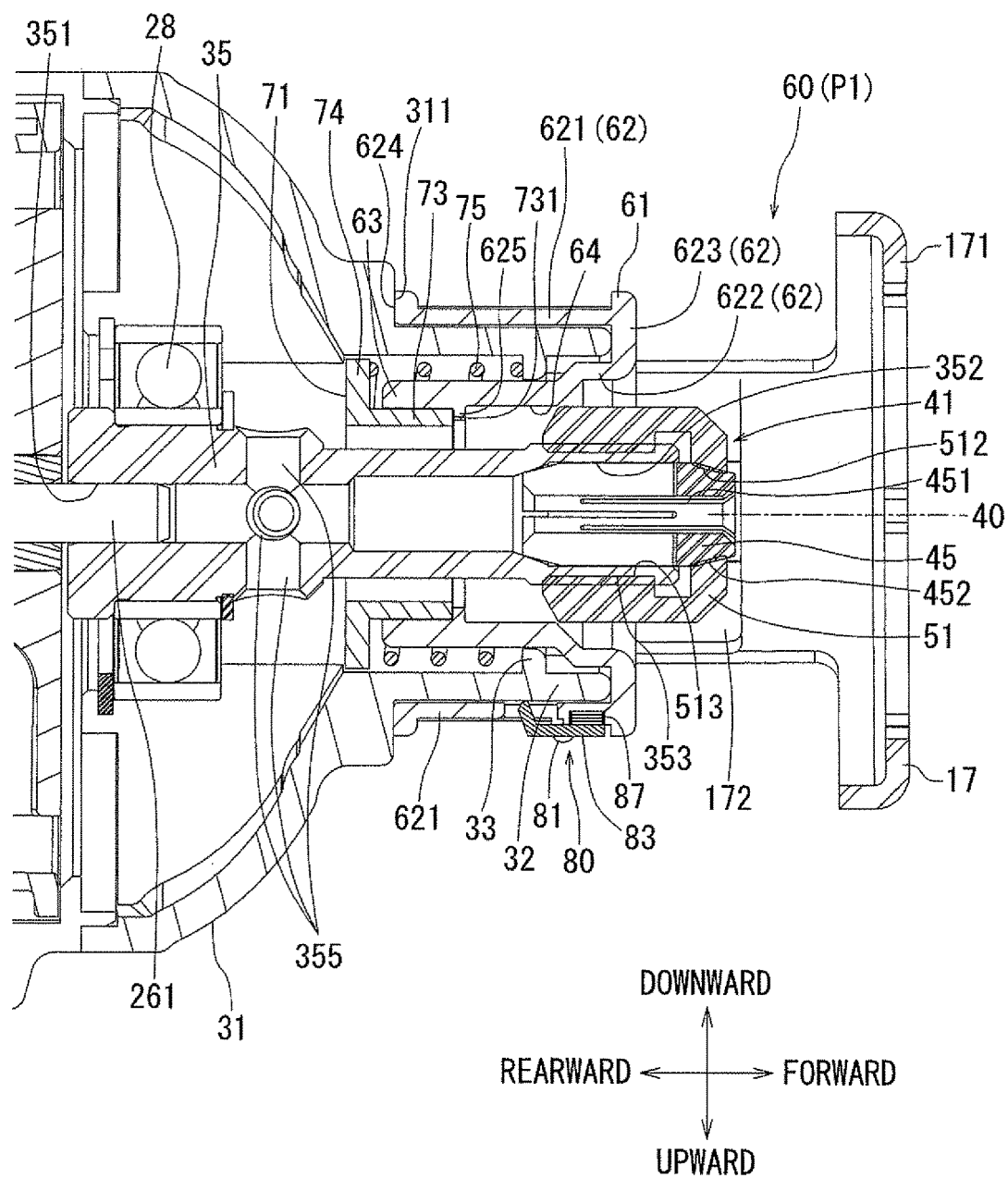
FIG. 5 is an enlarged view of a part of FIG. 2 showing an output section of the electric tool.
Figure 6:
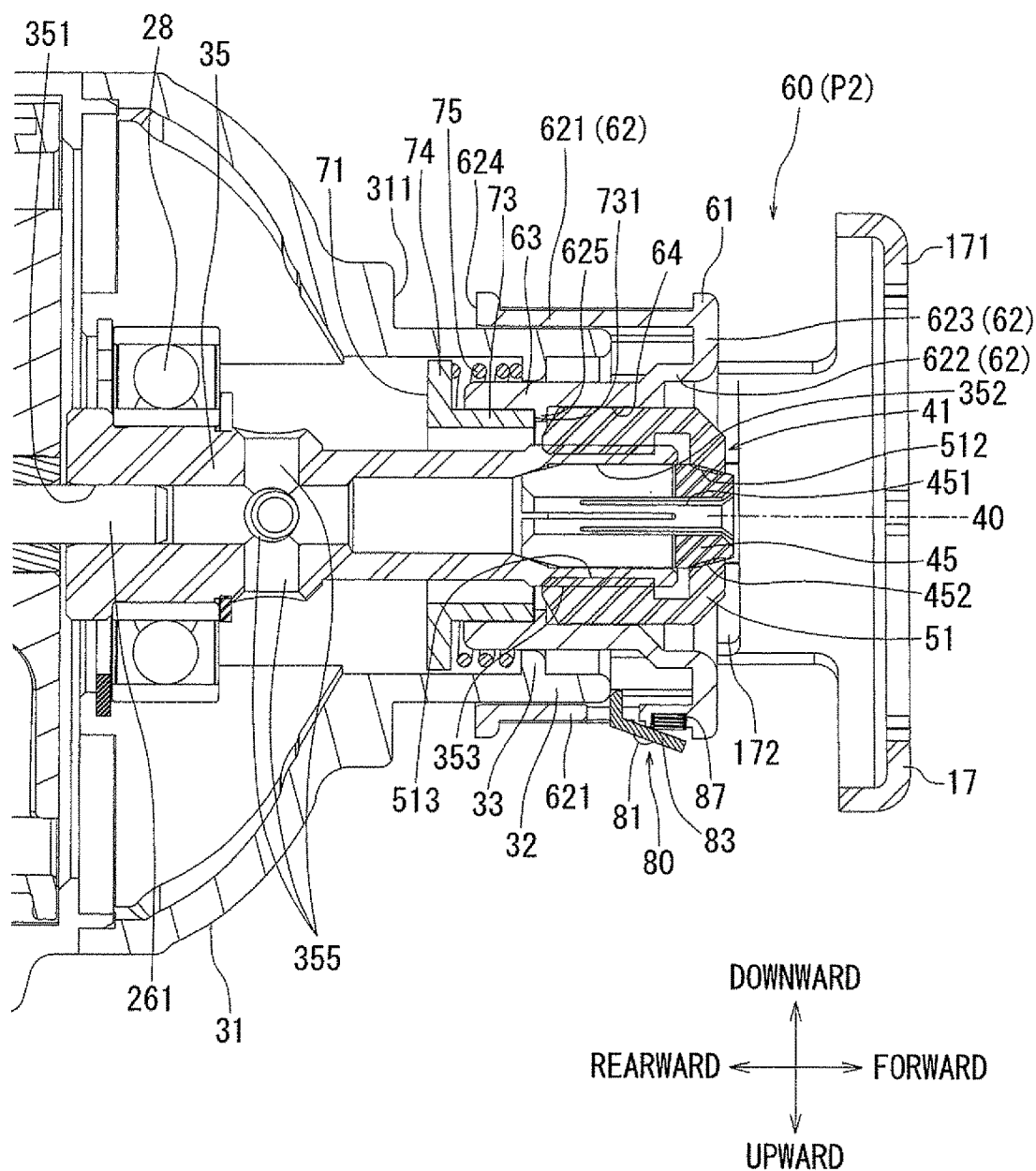
FIG. 6 is a view similar to FIG. 5 but showing the state where an operation mechanism has been operated.

The output section 30 positioned on the front side of the drive section 20 will now be described. FIG. 5 is an enlarged sectional view showing an internal structure of the output section 30 shown in FIG. 2. FIG. 6 shows an enlarged sectional view similar to FIG. 5 but showing the operation of an operation mechanism 60 shown in FIG. 5.

Figure 4:
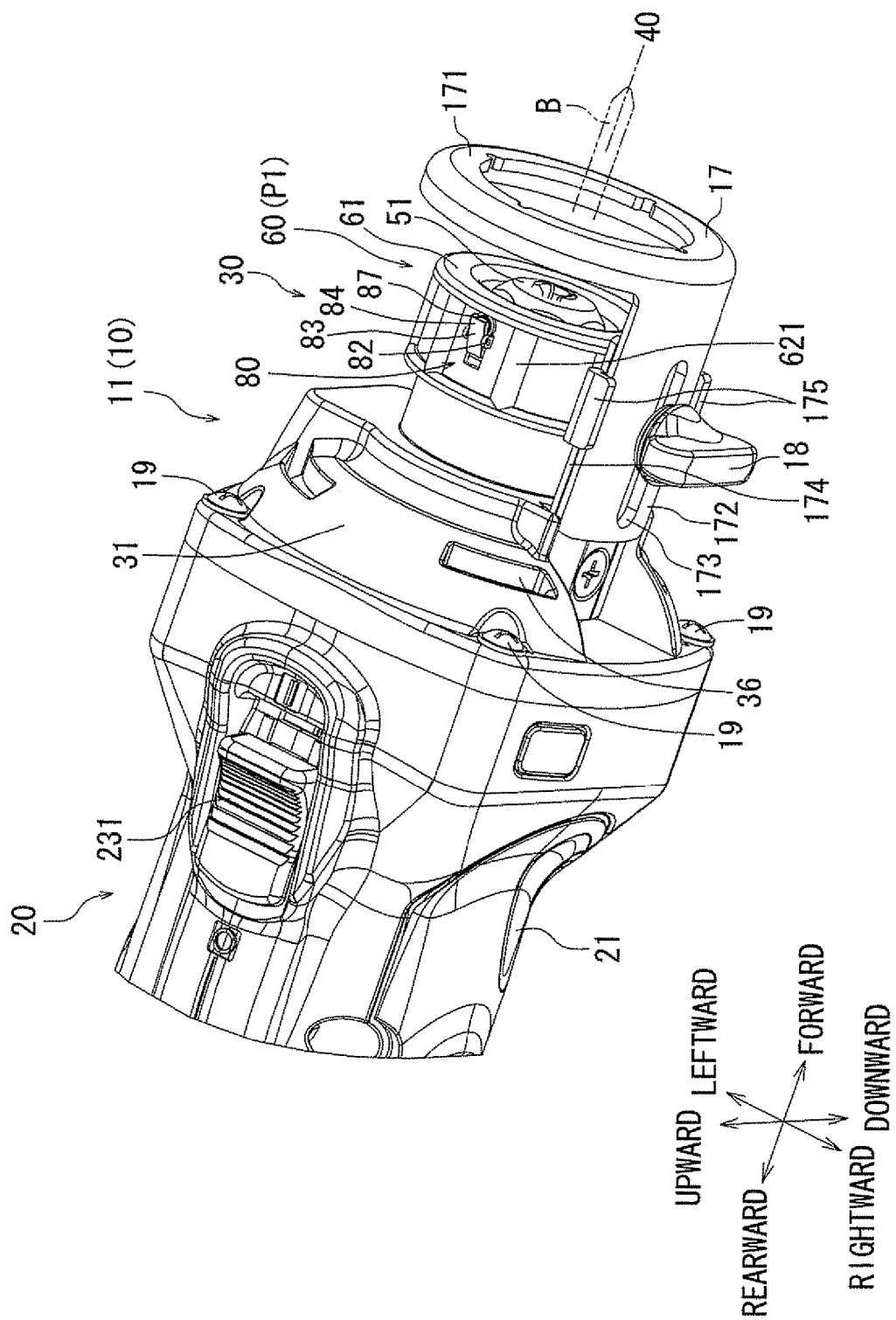
FIG. 4 is an enlarged perspective view of the front portion of the electric tool.

As shown in FIGS. 5 and 6, the output section 30 may be configured as a front section of the tool main body 11. The output section 30 mainly serves to hold and rotate the tool bit B. The output section 30 generally includes the front housing 31, the output spindle 35 and the bit mount mechanism 41. As shown in FIG. 4, the front housing 31 serving as a housing of the output section 30 is attached to the front end of the motor housing 21 by means of four screws 19. In this way the front housing 31 is fixed in position relative to the motor housing 21. Unlike the motor housing 21 divided into two halves, the front housing 31 is a one-piece member made of metal and may be formed by a forming process. The front housing 31 has front and rear openings. Therefore, the motor shaft 26 may be inserted into the front housing 31 from the rear side, and the output spindle 35 may be inserted into the front housing from the front side to protrude therefrom. In this way, the front housing 31 serves as a support housing for supporting the output spindle 35.

Figure 12:
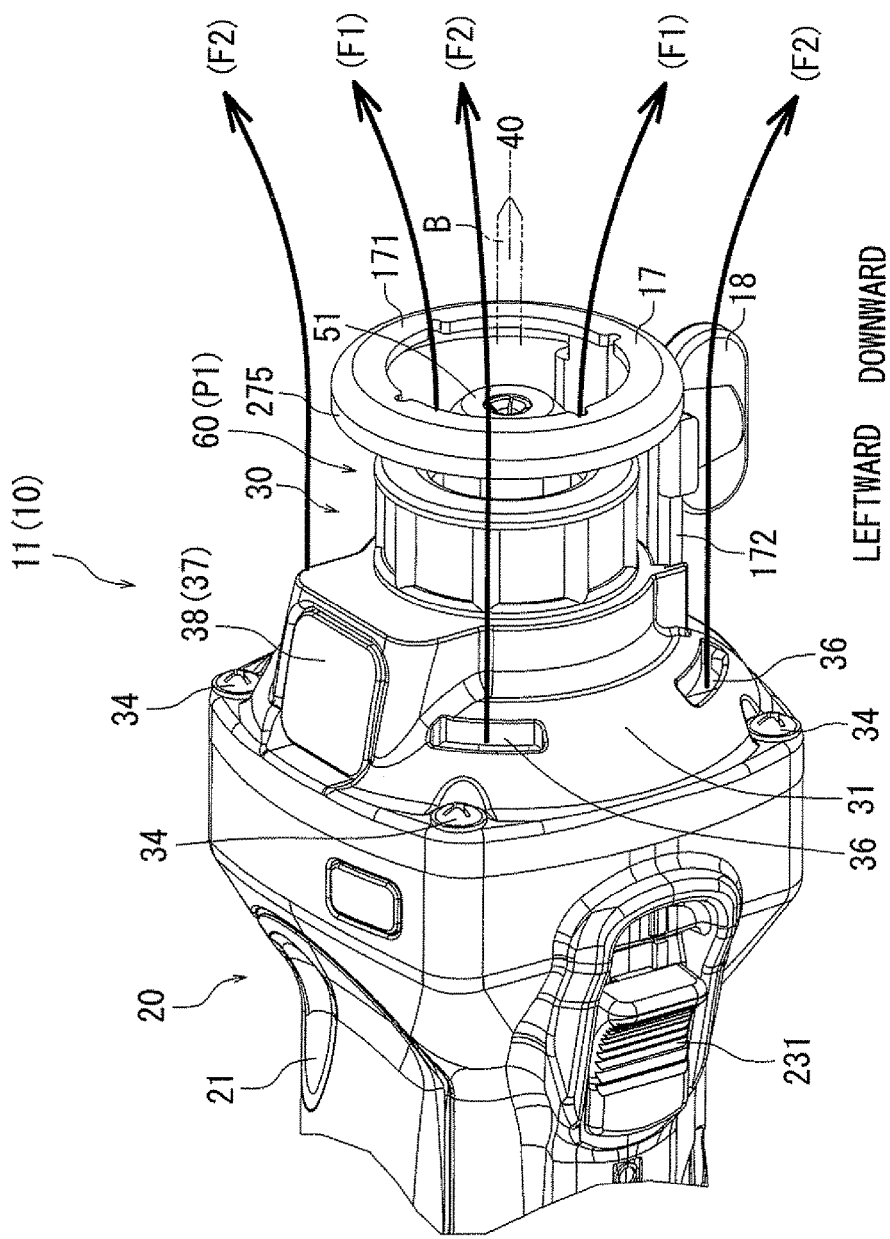
FIG. 12 is an enlarged perspective view of the front portion of the electric tool showing the streams of discharge air by thick lines.
Figure 13:
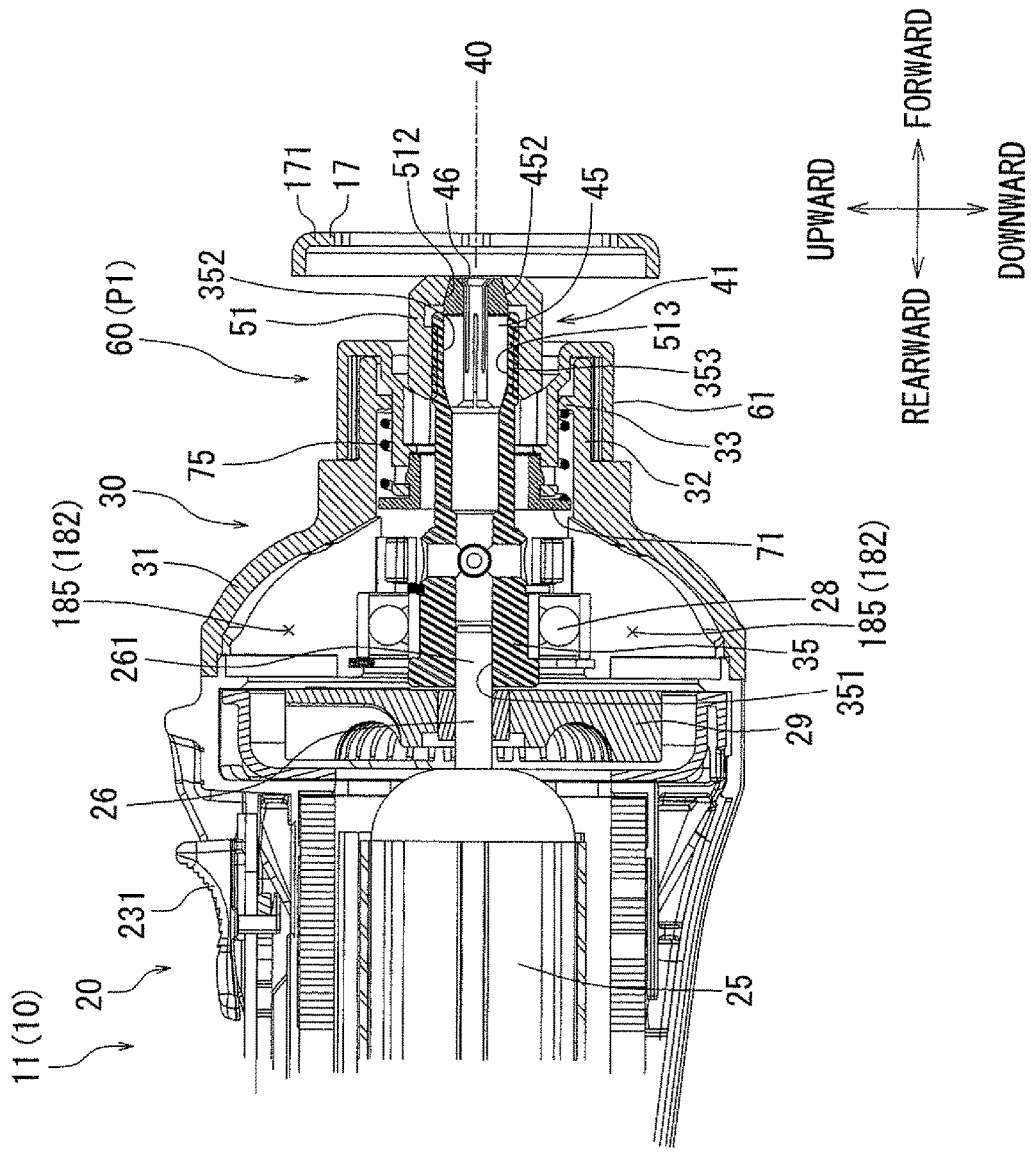
FIG. 13 is an enlarged view of a part of FIG. 2 showing a region around the output section of the electric tool.

As shown in FIGS. 4 and 12, the air-blow openings 36 is formed in the front portion of the front housing 31 for blowing out the air to the outside. In this embodiment, four air-blow openings 36 are provided at equal intervals along the circumferential direction of the front portion of the front housing 31 (see FIG. 16). More specifically, the air-blow openings 36 are arranged and configured such the air blown from the air-blow openings 36 is directed toward the shoe body 171 of the shoe 17, in particular toward the front portion of the shoe body 171 which may be opposed to a workpiece to be machined by the tool bit B. In other words, the air blown out of the air-blow openings 36 is directed toward the workpiece that is machined by the tool bit B. The air-blowing directions (discharge directions) of the air from the four air-blow openings 36 are directed such that air streams pass through points on the outer side of an outer circumferential edge 275 of the front portion of the shoe body 171 and are then directed radially outward as indicated by thick lines (see lines F2 in FIG. 12).

Figure 3:
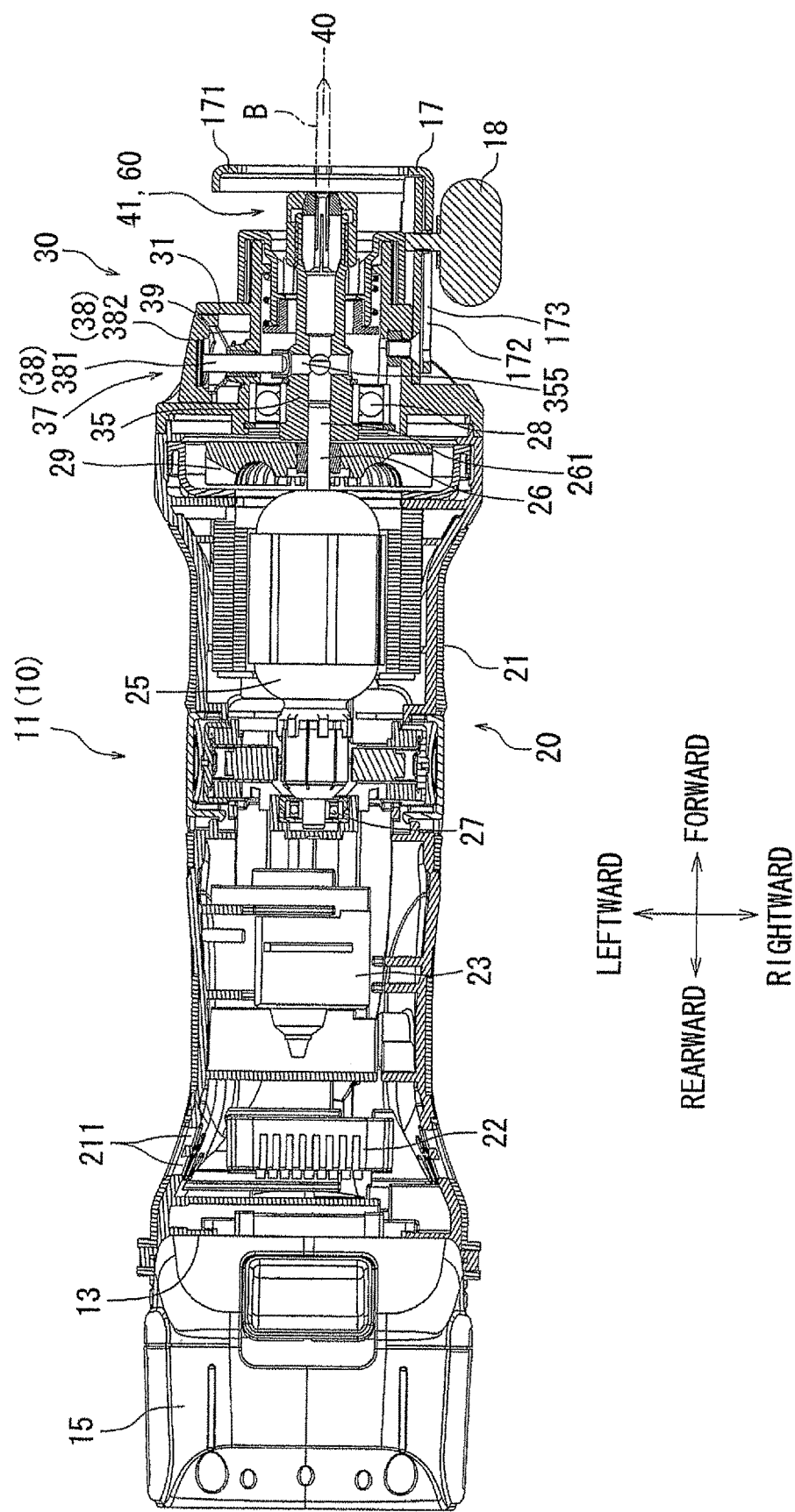
FIG. 3 is a horizontal sectional view of the electric tool showing the internal structure of the electric tool.
Figure 14:
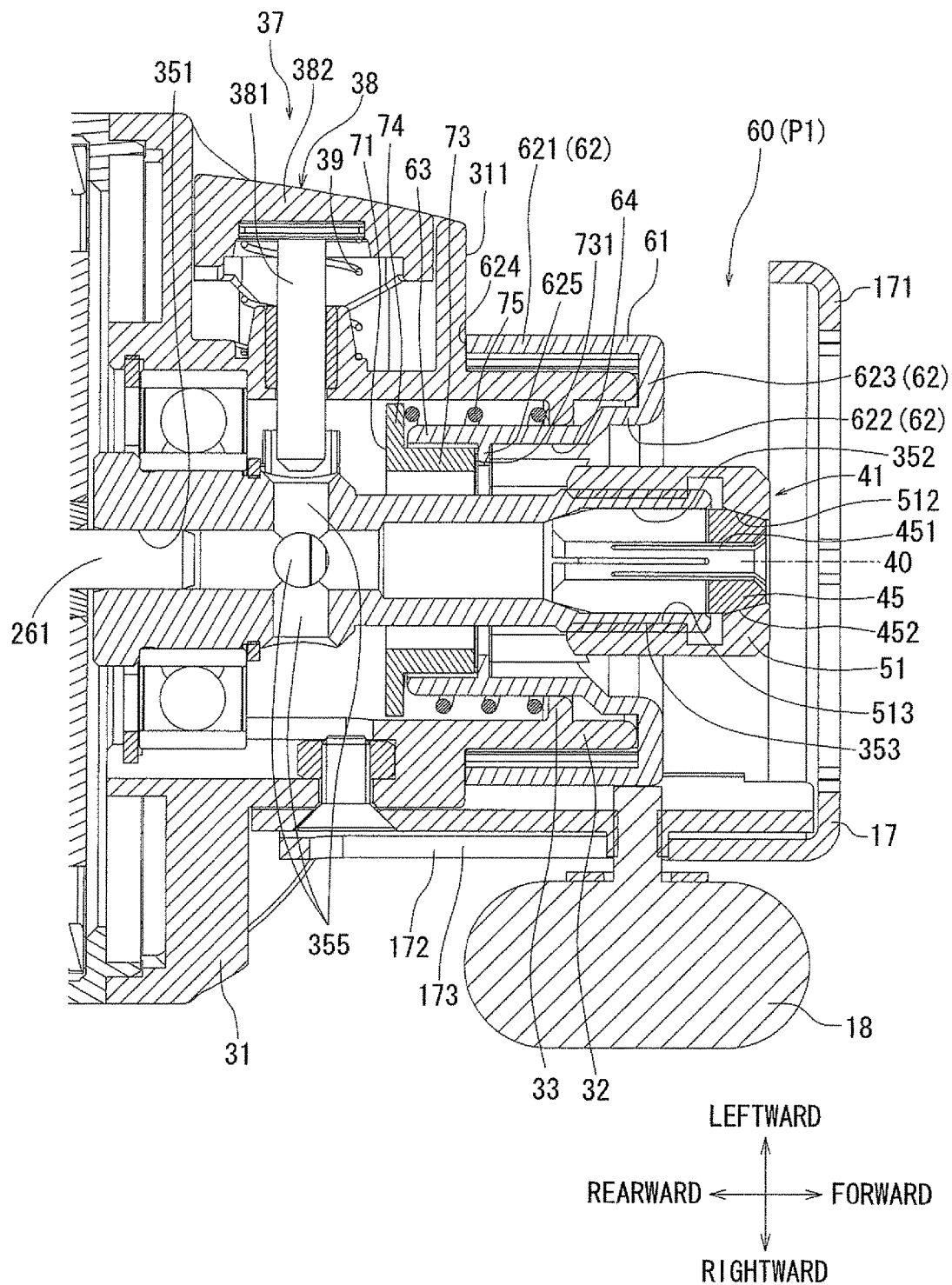
FIG. 14 is an enlarged view of a part of FIG. 3 showing the output section of the electric tool.
Figure 15:
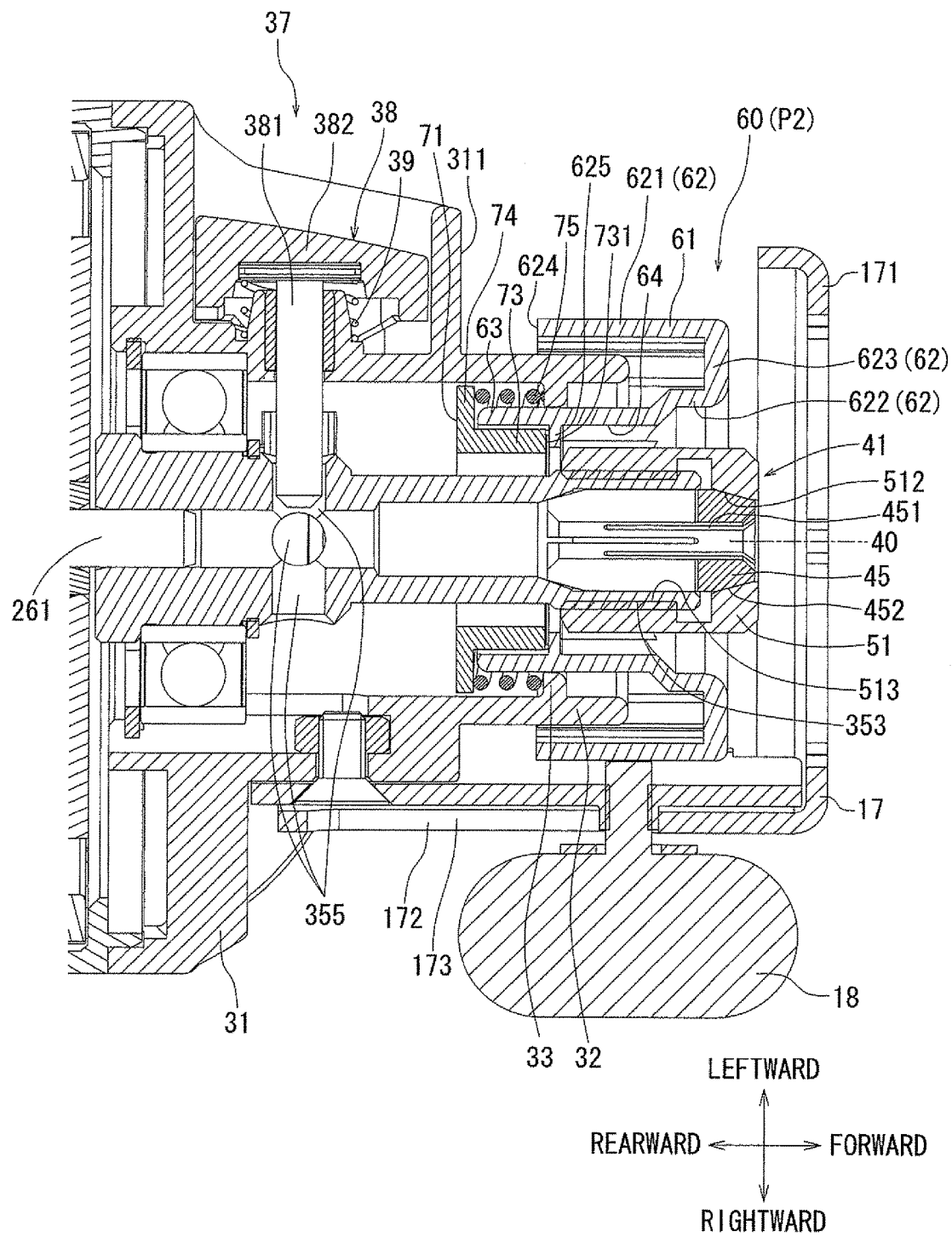
FIG. 15 is a view similar to FIG. 14 but showing the state where the operation mechanism has been operated.

As shown in FIGS. 5 and 14, the mount portion 172 of the shoe 17 is mounted to the right side surface of the front housing 31 by means of the finger screw 18. As shown in FIGS. 3 and 14, a shaft lock mechanism 37 may be provided on the left side portion of the front housing 31. As viewed from the front side or the rear side, the arrangement position of the finger screw 18 and the arrangement position of the shaft lock mechanism 37 are substantially symmetrical with each other with respect to the central axis of the front housing 31 that extends in the forward and rearward direction (first direction). In other words, as viewed from the front side or the rear side, the finger screw 18 and the shaft lock mechanism 37 are arranged along the left and right direction that intersects both the forward and rearward direction and the vertical direction. The shaft lock mechanism 37 may be used for locking the output spindle 35 not to rotate about the axis of the output spindle 35 before the tool bit B is mounted to the bit mount mechanism 41 that will be explained later. More specifically, the shaft lock mechanism 37 serves as a lock mechanism for preventing rotation of the bit mount mechanism 41 relative to the front housing 31. The shaft lock mechanism 37 may include an actuation member 38 and a biasing spring 39. The actuation member 38 includes an actuation main body 381 and an operation cover 382. The actuation main body 381 includes a pin. The operation cover 382 is coupled to the actuation main body 381 and may be operable by the operator. As the operator presses the operation cover 382, the actuation main body 381 may move radially inward, so that the pin may be inserted into any one of four insertion holes formed in the output spindle 35. The biasing spring 39 serves to normally bias the pin in the direction radially outward, i.e. a direction away from the insertion hole. Therefore, the pressing operation of the operation cover 382 of the actuation member 38 may be performed against the biasing force of the biasing spring 39. When the pin is inserted into one of the insertion holes of the output spindle 35, the output spindle 35 may be prevented from rotation. In this way, the shaft lock mechanism 37 serves to prevent rotation of the output spindle 35.

As shown in FIGS. 5 and 14, a front end 261 of the motor shaft 26 may extend into the front housing 31 and may be press-fitted into a rear fitting hole 351 formed in the rear end of the output spindle 35, so that the output spindle 35 can rotate together with the motor shaft 26. The output spindle 35 may be called an output shaft. A front fitting hole 352 may be formed in the front end of the output spindle 35. An insert 45 that will be explained later may be press-fitted into the front fitting hole 352 from its front side. A male thread portion 353 is formed on a part of the outer surface of the output spindle 35, into which the insert 45 is press-fitted. The male thread portion 353 can mesh with a female thread portion 513 of a nut 51 that will be explained later. The output shaft 35, with which the motor shaft 26 and the insert 45 are integrated, is rotatably supported by the front bearing 28. The front housing 31 fixedly supports the front bearing 28.

The bit mount mechanism 41 provided on the output spindle 35 will now be described. The bit mount mechanism 41 may be called a tool holder or a tool mount device. The bit mount mechanism 41 may be also called a bit fixing device. The bit mount mechanism 41 can be used for mounting the tool bit B to the output spindle 35 that is rotatably driven. The bit mount mechanism 41 generally includes the insert 45 and the nut 51. The nut 51 serves as a fastener.

The bit mount mechanism 41 may rotate as the motor 25 rotates. In order to hold the tool bit B, the bit mount mechanism 41 protrudes forward from the front end of the front housing 31. In this specification, the front end side with respect to the electric tool 10 may be also called one end side, and the rear end side opposite to the front end side with respect to the electric tool 10 may be also called the other end side.

FIG. 7(a) shows a perspective view of the insert 45, and FIG. 7(b) shows a sectional view of the insert 45 taken along line VIIb-VIIb in FIG. 7(a). FIG. 8(a) shows a perspective view of the nut 51, and FIG. 8(b) shows a sectional view of the nut 51 taken along line VIIIb-VIIIb in FIG. 8(a).

As shown in FIGS. 7(a) and 7(b), the insert 45 for press-fitting into the front fitting hole 352 of the output spindle 35 is configured to have a tubular shape into which the tool B can be fitted so as to be positioned on the same axis as a central axis 40 (see FIG. 1) of the output spindle 35. More specifically, the insert 45 has a front opening 46 communicating with the axial hole of the insert 45. The insert 45 can resiliently deform to decrease the inner diameter of the axial hole for holding the tool bit B inserted into the insert 45. More specifically, a plurality of slits 451 (four slits 451 are provided in this embodiment) are formed in the insert 45. The slits 451 extend in the axial direction of the central axis 40 and are spaced equally from each other in the circumferential direction. With these slits 451, a plurality of claw-like portions (four claw-like portions in this embodiment) may be formed. The claw-like portions may be individually tiltable in a radially outer direction and a radially inner direction. A tapered portion 452 may be formed at the front end portion of the outer circumferential surface of the insert 45.

As shown in FIG. 5, the nut 51 may be positioned on the radially outer side of the insert 45. The nut 51 has a front opening 52, through which the tool bit B can be inserted. As shown in FIGS. 8(a) and 8(b), the nut 51 includes a female thread portion 513 formed on its inner circumferential surface. The female threaded portion 513 may mesh with the male thread portion 353 formed on the outer surface of the output spindle 352. A diameter-decreasing portion 512 having an inclination conforming to the inclination of the tapered portion 452 is formed on the front end portion of the inner circumferential surface of the nut 51. The diameter-decreasing portion 512 may contact or may not contact the tapered portion depending on the meshing position of the female thread portion 513 with the male thread portion 353. When the nut 51 is rotated in the thread-tightening direction relative to the output spindle 35 in the state where the diameter-decreasing portion 512 is in contact with the tapered portion 452, the diameter-decreasing portion 512 may apply a pressing force in the radially inward direction against the tapered portion 452 of the insert 45. Therefore, the front end of the insert 45 may receive a force in a diameter-decreasing direction. In this way, the tool bit B inserted into the insert 45 through the front opening 46 may be held by the insert 45. More specifically, the inner circumferential surface of the insert 45 may be pressed against the outer circumferential surface of the tool bit B. At that time, the nut 51 may be positioned at a tightening position (hereinafter called a bit holding position) against the insert 45.

When the nut 51 does not apply a pressing force against the insert 45 (herein after called a bit releasing position), the inner diameter of the insert 45 may have a normal diameter value that is given when no load is applied to the insert 45. The bit releasing position of the nut 51 is positioned on the front side of the bit holding position. When the nut 51 is positioned at the bit releasing position, the diameter-reducing portion 52 may not apply a pressing force in the radially inner direction against the tapered surface 452. Therefore, the inner circumferential surface of the insert 45 also may not be pressed against the outer circumferential surface of the tool bit B, so that the insert 45 may not hold the tool bit B. Hence, the tool bit B can be removed from and inserted into the insert 45 when the nut 51 is positioned at the bit releasing position. In this way, the diameter-decreasing portion 512 can apply a force in the radially inward direction to the outer circumferential surface of the insert 45 so as to cause decrease in the inner diameter of the insert 45 depending on the meshing position of the female thread portion 513 with the male thread portion 353. The rotational axis of the nut 51 may be the same as the rotational axis 40 of the output spindle 35.

The operation mechanism 60 for operating the bit mount mechanism 41 will now be described. The operation mechanism 60 may be also called an operation device or an operation section. As shown in FIGS. 5, 6, 14 and 15, the operation mechanism 60 is provided at the front housing 31. The operation mechanism 60 generally includes an engaging member 61, a stopper 71 and a biasing spring 75. As shown in FIG. 4, the engaging member 61 has a substantially annular shape and generally includes a guide portion 62, a coupling portion 63 and an engaging portion 64. The guide portion 62 serves as a guide for allowing a sliding movement of the engaging portion 64. The guide portion 62 has a double wall structure so as to be opposed to a guide edge portion 32 of the front housing 31 from both the radially outer side and the radially inner side. The guide edge portion 32 protrudes forwardly from the front end of the front housing 31 and has a substantially circular ring shape. Therefore, the guide portion 62 includes an outer ring 621 and an inner ring 622 each having a circular ring shape corresponding to the ring shape of the guide edge portion 32. The outer ring 621 and the inner ring 622 are connected to each other by a turn-back portion 623 disposed on the front side thereof. The coupling portion 63 is disposed at the rear end of the inner ring 622 of the guide portion 62. The stopper 71 has a coupling portion 73 for coupling to the coupling portion 63. More specifically, the coupling portion 63 of the engaging member 61 has a female coupling configuration that can be coupled to the coupling portion 73 having a male coupling configuration. The inner circumferential surface of the inner ring 622 may be configured as the engaging portion 64. The engaging portion 64 is formed so as to engage the outer circumferential surface of the nut 51. Due to the engagement of the engaging portion 64 with the outer circumferential surface of the nut 51, the nut 51 may rotate together with the engaging portion 64 about the rotational axis 40 (see FIGS. 5 and 14).

As shown in FIGS. 5 and 14, a rear end 624 of the outer ring 621 of the engaging member 61 is opposed to a front surface 311 of the front housing 31. The biasing spring 75 biases the engaging member 61 in the rearward direction, i.e., a direction in which the rear end 624 of the outer ring 621 moves toward the front surface 311, so that the rear surface of the turn-back portion 623 may contact the front end of the guide edge portion 32. At the same time, the rear end 624 of the outer ring 621 may contact the front surface 211 of the front housing 31 or may be positioned proximal to the front surface 211. Therefore, it may be possible to prevent dust from entering within the front housing 31, in particular within the space where the biasing spring 75 is disposed. In addition, a projection 625 may be formed on the inner circumferential surface of the inner ring 622 of the engaging member 61 and may protrude radially inward therefrom. The projection 625 may contact the front end of the coupling portion 73 of the stopper 71 in the axial direction. Further, the outer circumferential surface of the coupling portion 73 and the inner circumferential surface of the coupling portion 63 are opposed to each in the diametrical direction. Therefore, the projection 625 may prevent dust from entering the space where the output spindle 35 is provided, via a clearance formed between the inner circumferential surface of the coupling portion 63 and the outer circumferential surface of the coupling portion 73.

The stopper 71 also may have a substantially ring shape. The stopper 71 generally includes the coupling portion 73 and an outer flange portion 74. The outer flange portion 74 is configured to slidably contact the inner circumferential surface of the front housing 31. With this sliding contact with the inner circumferential surface of the front housing 31, the stopper 71 and the engaging member 61 may be guided with respect to the movement in the forward and rearward direction. The outer flange portion 74 is configured to support one end of the biasing spring 75. The coupling portion 73 is configured as a male coupling that may be fitted into the coupling portion 63 of the engaging member 61. Therefore, the stopper 71 is fixedly coupled to the engaging member 61 through fitting between the coupling portion 73 and the coupling portion 63. In this way, the stopper 71 serves as a part of the engaging member 61. The outer flange portion 74 is disposed on the rear side of the coupling portion 73. The rear end of the biasing spring 75 may contact the outer flange portion 74. The biasing spring 75 may be a coil spring or any other suitable resilient member and serves to bias the engaging member 61 in a disengaging direction for disengagement of the engaging member 61 from the bit mount mechanism 41. The biasing spring 75 is held within the front housing 31 that supports the output spindle 35. More specifically, the biasing spring 75 is positioned between the guide edge portion 32 of the front housing 31 and the inner ring 622 of the engaging member 61 with respect to the diametrical direction. The front end of the biasing spring 75 may contact an inner flange portion 33 that protrudes radially inward from the guide edge portion 32 toward the inner ring 622. The inner flange portion 33 may be called a protrusion protruding from the front housing 31. As described previously, the rear end of the biasing spring 75 may contact the outer flange portion 74. In this way, the biasing spring 75 serves to bias the engaging member 61 and the stopper member 71 that is a member on the side of the engaging member 61, in a rearward direction with respect to the tool main body 11. The font end and the rear end of the biasing spring 75 may slidably contact the inner flange portion 33 and the outer flange portion 74, respectively. The biasing direction of the biasing spring 75 that is one of the components of the operation mechanism 60 is determined to be perpendicular to the biasing direction of the biasing spring 39 that is one of the components of the shaft lock mechanism 37.

The rearward movement of the engaging member 61 and the stopper 71 caused by the biasing force of the biasing spring 75 may be stopped through contact of the rear surface of the turn-back portion 623 with the front end of the guide edge portion 32 as shown in FIGS. 5 and 14. The stop position of the engaging member 61 shown in FIGS. 5 and 14 is determined as a disengaging position (P1). When the engaging member 61 is positioned at the disengaging position (P1), the engaging member 61 does not engage the outer circumferential surface of the nut 51, so that the nut 51 may not rotate together with the engaging member 61. On the other hand, when the engaging member 61 moves forwardly so as to be positioned at an engaging position (P2) shown in FIGS. 6 and 15, the engaging portion 64 of the engaging member 61 may engage the outer circumferential surface of the nut 51, so that the nut 51 can rotate together with the engaging member 61. The outer circumferential surface of the nut 51 may have a hexagonal shape in cross section.

In this way, the engaging portion 64 engages the outer circumferential surface of the nut 51 when the engaging member 61 is positioned at the engaging position (P2). The engaging position (P2) is spaced away from the disengaging position (P1) along the forward and rearward direction of the front housing 31. When the engaging member 61 is positioned at the engaging position (P2), the nut 51 can rotate together with the engaging member 61 as the engaging member 61 rotates about the rotational axis 40. In this way, by rotating the engaging member 61, the nut 51 may rotate to move relative to the insert 45 through the thread engagement with the output spindle 35. In this way, the disengaging position (P1) and the engaging position (P2) are spaced from each other in the forward and rearward direction along the rotational axis 40. More specifically, the engaging position (P2) is positioned forwardly of the disengaging position (P1) along the rotational axis 40.

The inner circumferential surface of the engaging portion 64 of the engaging member 61 may have any cross sectional shape as long as it can engage the outer circumferential surface of the nut 51 with respect to the rotational direction. FIGS. 20(*a*) and 20(*b*) show a first example regarding the engagement structure between the nut 51 and the engaging member 61. In this example, the outer circumferential surface of the nut 51 has a hexagonal shape as described above and as shown in FIG. 20(*a*), while the inner circumferential surface of the engaging portion 64 has a bihexagonal shape as shown in FIG. 20(*b*). This example may be advantageous because the engaging portion 64 can easily engage the nut 51. FIGS. 21(*a*) and 21(*b*) show a second example regarding the engagement structure between a nut 51' and an engaging member 61' having an engaging portion 64'. In this example, the outer circumferential surface of the nut 51' has six protrusions 57 protruding radially outward from the outer circumferential surface and spaced equally from each other in the circumferential direction. The inner circumferential surface of the engaging portion 64' has twelve grooves spaced equally from each other in the circumferential direction and each configured to conform to the shape of the protrusion 57. Also, this example may be advantageous because the engaging portion 64' can easily engage the nut 51'.

An engagement keeping mechanism 80 will now be described. The engagement keeping mechanism 80 is operable to keep the engaging member 64 at the engaging position (P2) where the engaging portion 64 of the engaging member 61 engages the outer circumferential surface of the nut 51. In this embodiment, the engagement keeping mechanism 80 can keep the engaging member 64 at the engaging position (P2) as long as the engagement keeping mechanism 80 is not operated for releasing.

Figure 9:
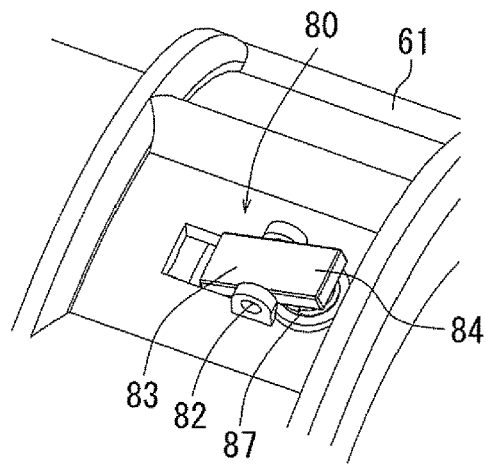
FIG. 9 is an enlarged view of a part of FIG. 4 showing an engagement keeping mechanism.
Figure 10:
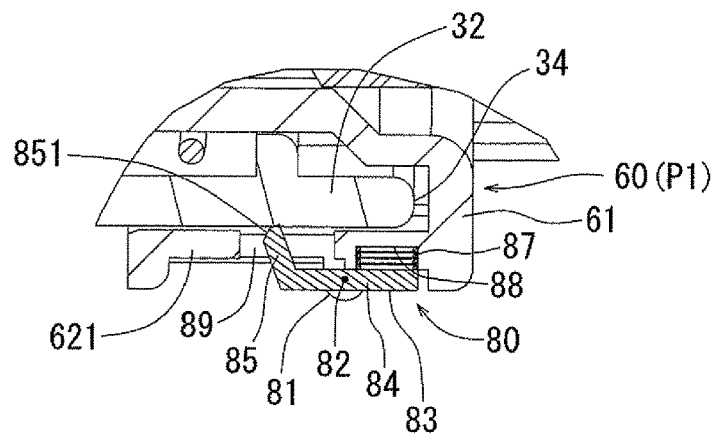
FIG. 10 is an enlarged view of a part of FIG. 5 showing the engagement keeping mechanism.
Figure 11:
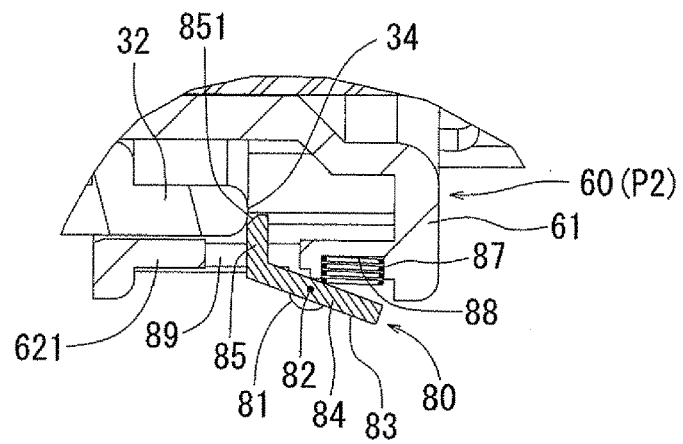
FIG. 11 is an enlarged view of a part of FIG. 6 showing the engagement keeping mechanism.

The engagement keeping mechanism 80 is provided at a position proximal to the front housing 31. The engagement keeping mechanism 80 is shown in an enlarged view in FIG. 9 that is an enlarged view of a part of FIG. 4. The cross sectional view of the engagement keeping mechanism is shown in FIG. 10 that is an enlarged view of a part of FIG. 5. The cross sectional view of the engagement keeping mechanism 80 is also shown in FIG. 11 that is an enlarged view of a part of FIG. 6. The engagement keeping mechanism 80 is disposed at the outer ring 621 of the engaging member 61. The engagement keeping mechanism 80 generally includes a pivotal support 81 mounted to or formed on the outer ring 621, an engagement keeping member 83 pivotally supported by the pivotal support 81, and a biasing spring 87 for biasing the engagement keeping member 83 toward an engaging keeping position. As shown in FIG. 9, the pivotal support 81 protrudes outwardly from the outer circumferential surface of the outer ring 621. The pivotal support 81 includes a support pin 82 that pivotally supports the engagement keeping member 83.

As shown in FIGS. 10 and 11, the engagement keeping member 83 may be bent to have a substantially L-shape in cross section and may include an operation wall portion 84 and a contact wall portion 85. Similar to the outer circumferential surface of the outer ring 621, the operation wall portion 84 may be exposed to the outside for enabling access by the operator. More specifically, the operation wall portion 84 is configured such that the operator can push the operation wall portion 84 by using a finger(s). One end of the biasing spring 87 contacts the front portion of the operation wall portion 84. The biasing spring 87 may be a coil spring and biases the operation wall portion 84 toward the outside. The biasing member 87 is received within a retaining recess 88 formed in the outer ring 621, so that the other end of the biasing member 87 contacts the bottom of the retaining recess 88. The contact wall portion 85 is formed on the rear side of the operation wall portion 84 and is configured to extend into inside of the outer ring 621. To this end, the contact wall portion 85 extends in a direction intersecting an extending direction of the operation wall portion 84. As shown in FIGS. 10 and 11, the contact wall portion 85 extends into inside of the outer ring 621 in the radially inward direction so as to be able to contact with a front end 34 of the guide edge portion 32. In this connection, a communication hole 89 may be formed in the outer ring 621, so that the contact wall portion 85 can extend into inside of the outer ring 621 via the communication hole 89. The communication hole 89 may be formed, for example, by cutting out a part of the outer ring 621 to extend into inside and outside of the outer ring 621. The contact wall portion 85 has a radially inner end 851 inclined rearwardly in the radially outward direction for contacting the front end 34 of the guide edge portion 32 in the forward and rearward direction. In this way, as the engagement keeping member 83 pivots about the support pin 82 by the biasing force of the biasing spring 87, the radially inner end 851 may be positioned for contacting with the front end 34 of the guide edge portion 32.

When the engaging member 61 is positioned at the disengaging position (P1), the contact wall portion 85 of the engagement keeping member 83 may not contact the front end 34 of the guide edge portion 32 but may contact the outer circumferential surface of the guide edge portion 32 as shown in FIG. 10. In the state shown in FIG. 10, the operation wall portion 84 of the engagement keeping member 83 extends substantially parallel to the outer circumferential surface of the outer ring 621. On the other hand, when the engaging member 61 is positioned at the engaging position (P2), the radially inner end 851 of the contact wall portion 85 of the engagement keeping member 83 contacts the front end 34 of the guide edge portion 32 as shown in FIG. 11. The position of the contact wall portion 85 shown in FIG. 11 may be kept by the biasing force of the biasing spring 87, so that the engaging member 61 may be prevented from moving from the engaging position (P2) to the disengaging position (P1). In this way, the engaging member 61 may be kept at the engaging portion (P2). In this state, the operation wall portion 84 of the engagement keeping member 83 extends to obliquely intersect the outer circumferential surface of the outer ring 621. In addition, as the engaging member 61 moves from the disengaging position (P1) to the engaging position P(2), the engagement keeping member 83 automatically pivots from the position shown in FIG. 10 to the position shown in FIG. 11 by the biasing force of the biasing spring 87.

Therefore, the operator can determine whether the engaging member 61 is positioned at the disengaging position (P1) or the engaging position (P2) based on the extending direction of the operation wall portion 84 of the engagement keeping member 83 relative to the outer circumferential surface of the outer ring 621. Thus, the operator can determine that the engaging member 61 is positioned at the disengaging position (P1) if the operation wall portion 84 of the engagement keeping member 83 extends substantially parallel to the outer circumferential wall of the outer ring 621. On the other hand, the operation can determine that the engaging member 61 is positioned at the engaging position (P2) if the operation wall portion 84 of the engagement keeping member 83 extends in a direction obliquely intersecting the outer circumferential wall of the outer ring 621. In this way, the operator can determine whether or not the engaging member 61 engages the bit mount mechanism 41 based on the extending direction of the engagement keeping member 83 including the operation wall portion 84 relative to the outer circumferential surface of the outer ring 621. Therefore, the engagement keeping member 83 including the operation wall portion 84 serves as a determination device for determining the position of the engaging member 61. In one embodiment, a marker(s) indicating the extending direction of the operation wall portion 84 of the engagement keeping member 83 may be provided for helping visual recognition of the disengaging position (P1) and/or the engaging position (P2). With this arrangement, the operator can further easily reliably determine the extending direction of the operation wall portion 84. Hence, the operator can further easily reliably determine the position of the engaging member 61. In addition, the engagement keeping member 83 including the operation wall portion 84 may serve as a part of an indicator that indicates the extending direction of the operation wall portion 84. For example, an output device such as a lamp indicator may be provided for outputting information regarding the extending direction of the operation wall portion 84, so that the operator can more easily determine the position of the engaging member 61.

Figure 22:
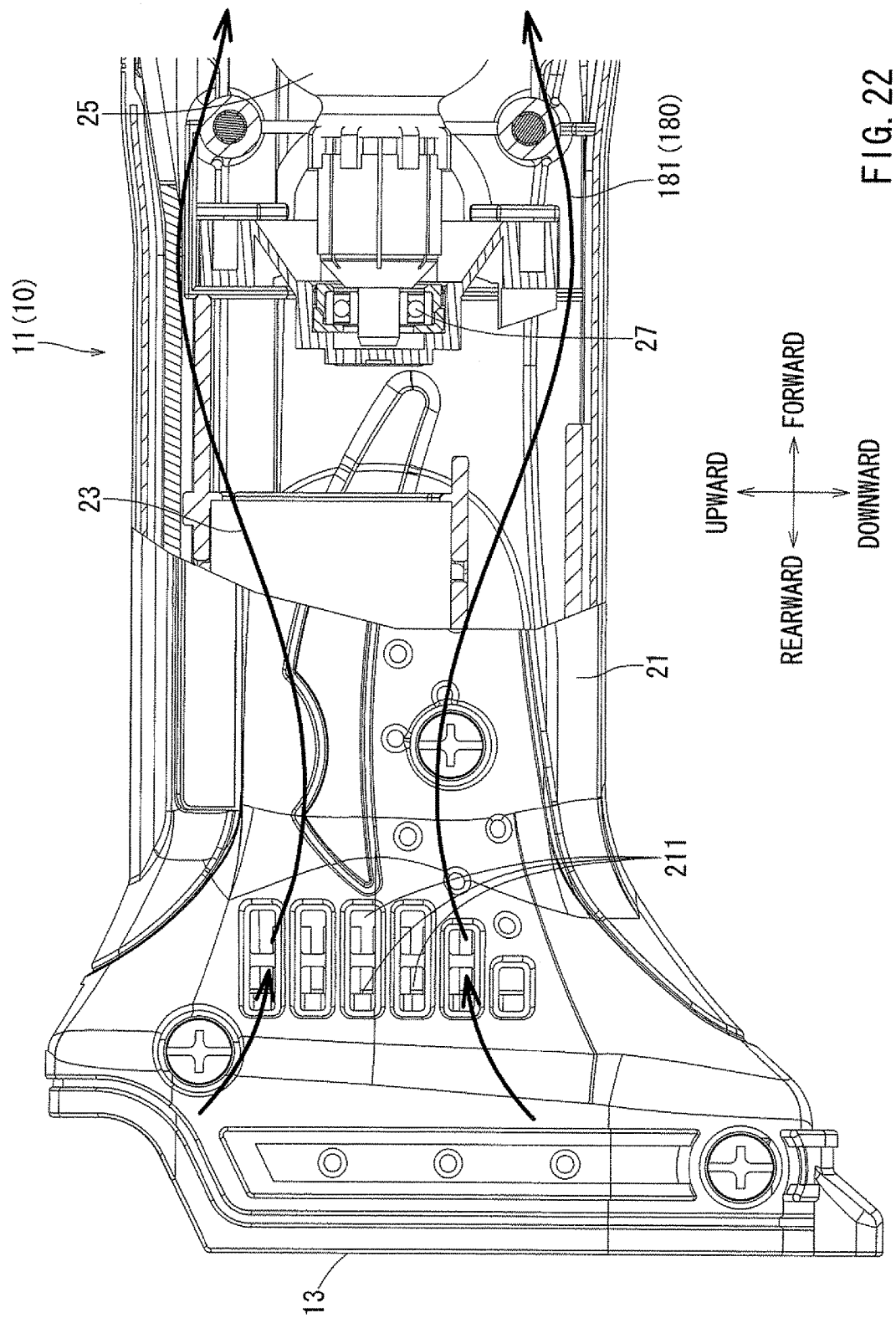
FIG. 22 is an enlarged view of the rear portion of the electric tool showing a rear part of a second air flow passage.
Figure 23:
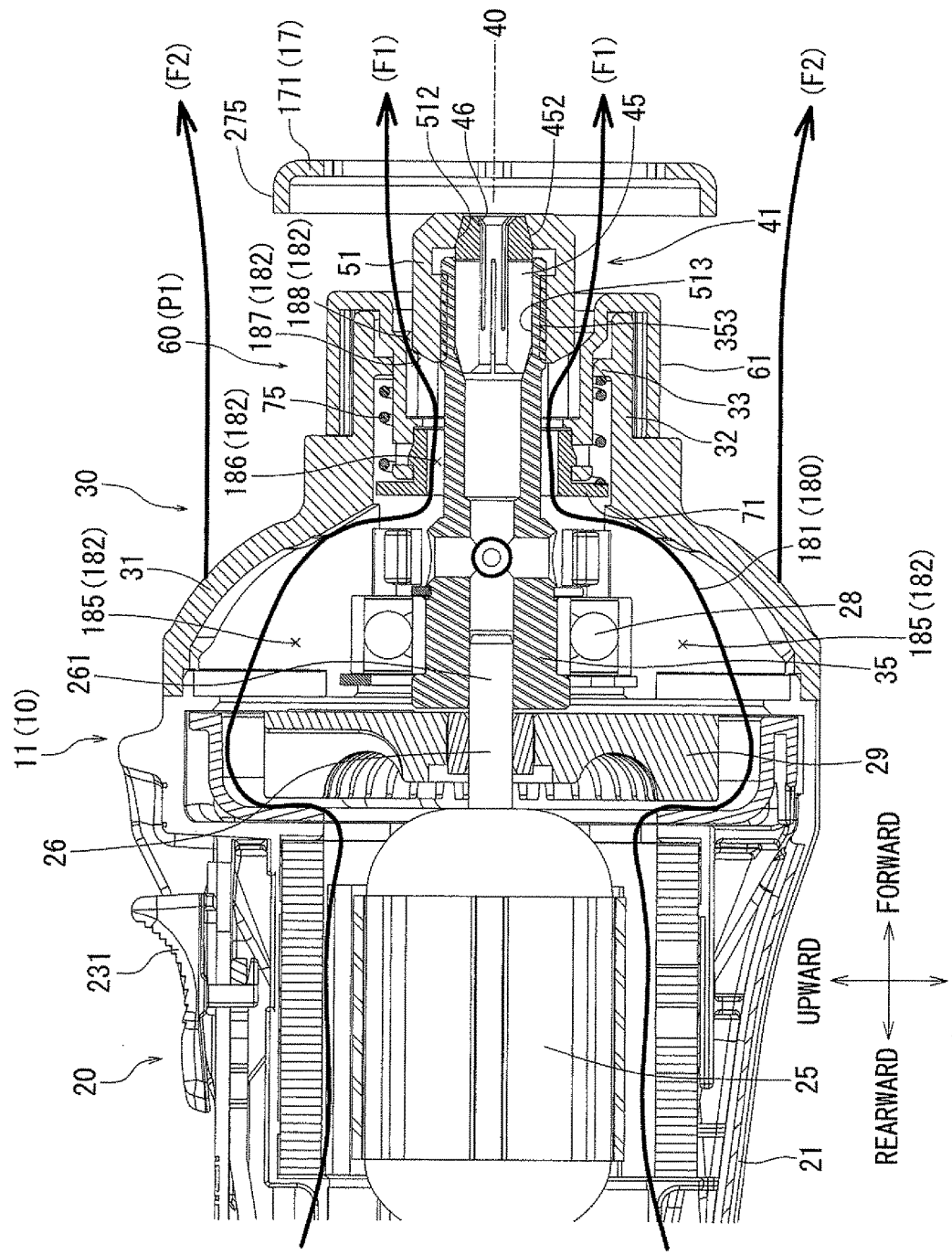
FIG. 23 is an enlarged view of the front portion of the electric tool showing a front part of the second air flow passage.

As described previously, the air flow passage is formed for the flow of air that is introduced into the tool man body 11 via the inlet openings 211 and thereafter discharged to the outside via the air-blow openings 36 by the operation of the fan 29. This air flow passage will be hereinafter called a first air flow passage. In the case of this embodiment, the air introduced into the tool man body 11 via the inlet openings 211 by the operation of the fan 29 may be also discharged via a second air flow passage 180 that does not include the air blow openings 36. The second air flow passage 180 includes a front blow opening 188 provided between the bit mount mechanism 41 and the operation mechanism 60 (see FIG. 23) for discharging air from the tool man body 11. FIGS. 22 and 23 respectively show a rear part and a front part of the second air flow passage 180 in an enlarged scale. Within the motor housing 21, the second flow passage 180 runs along the same route as the first air flow passage. Thus, as the fan 29 rotates, air may be introduced into the motor housing 21 via the inlet openings 211 so as to serve as a cooling air that cools the controller 22, the switch 23 and the motor 25 in this order. After passing through the fan 29, the air may flow into the front housing 31. In this way, a passage part 181 within the motor housing 21 of the second air flow passage 180 runs along the routes indicated by thick solid lines in FIG. 22. The passage part 181 runs through various components (including the controller 22, the switch 23 and the motor 25, etc.) disposed within the motor housing 21. In other words, the passage part 181 is defined by the motor housing 21, controller 22, the switch 23, the motor 25, etc. After leaving the passage part 181, the air may flow into the fan 29 that may be called an air blowing device. After flowing through the fan 29, the air may enter the front housing 31. Thus, the second air flow passage 180 includes a passage part 182 within the front housing 31. The passage part 182 is indicated by thick solid lines in FIG. 23. The passage part 182 runs through various components (including the output spindle 35, the front bearing 28, the bit mount mechanism 41, the operation mechanism 60, etc.) disposed within the front housing 31. In other words, the passage part 182 is defined by the front housing 31, the output spindle 35, the front bearing 28, the bit mount mechanism 41, the operation mechanism 60, etc.

Figure 19:
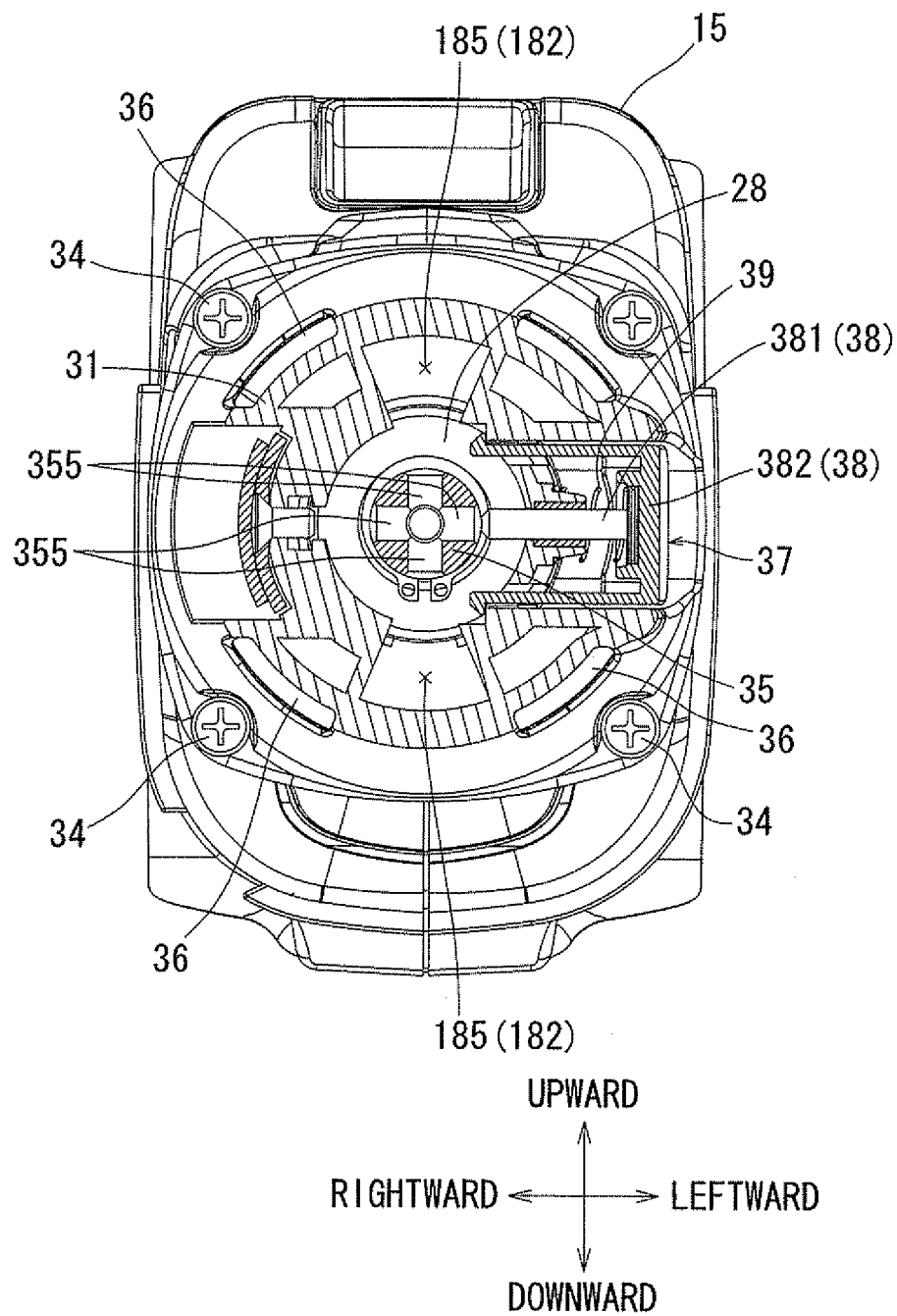
FIG. 19 is a sectional view taken along line XIX-XIX in FIG. 2.

The second air flow passage 180 will be described in more detail. As shown in FIGS. 19 and 23, the air blown from the fan 29 may flow forwardly after passing through air passage holes 185. The air passage holes 185 may be formed, for example, by cutting-out portions of the front housing 31 that supports the front bearing 28. In this embodiment, a pair of air passage holes 185 are formed so as to be positioned in point symmetry with respect to the output spindle 35 such that one of the air passage holes 185 is positioned on the upper side of the output spindle 35 and the other is positioned on the lower side of the output spindle 35. Therefore, the front bearing 28 is supported by a portion of the front housing 31, which portion does not include the air passage holes 185. As shown in FIGS. 18 and 23, after passing through the air passage holes 185, the air may flow into air passage holes 186. The air passage holes 186 may be formed, for example, by cutting-out portions of the outer flange portion 74 of the stopper 71. Two pairs of air passage holes 186 may be formed to be positioned in point symmetry with respect to the output spindle 35 such that one of two pairs of the air passage holes 186 is positioned on the upper side of the output spindle 35 and the other is positioned on the lower side of the output spindle 35. Therefore, the air passage holes 186 in one of the two pairs are positioned obliquely leftward and rightward on the upper side of the output spindle 35, while the air passage holes 186 in the other of the two pairs are positioned obliquely leftward and rightward on the lower side of the output spindle 35. As shown in FIGS. 17 and 23, after passing though the air passage holes 186, the air may flow into an air passage gap 187 formed between the bit mount mechanism 41 and the operation mechanism 60. More specifically, the air passage gap 187 is formed between the outer circumferential surface of the nut 51 of the bit mount mechanism 41 and the inner circumferential surface of the engaging member 61 of the operation mechanism 60. The air passage gap 187 extends throughout the entire circumferential length of the inner circumferential surface of the engaging member 61. In this way, the air blown from the fan 29 may flow through the air passage holes 185, the air passage holes 186 and the air passage gap 187 in this order in the axial direction of the output spindle 35. In other words, an air passage space is defined between the outer circumferential surface of the output spindle 35 and the inner circumferential surface of the front housing 31 that supports the output spindle 35. The air may flow through the air passage space in the axial direction of the output spindle 35 toward the bit mount mechanism 41 and the operation mechanism 60 disposed on the front end side so as to reach to the bit mount mechanism 41 and the operation mechanism 60.

Figure 16:
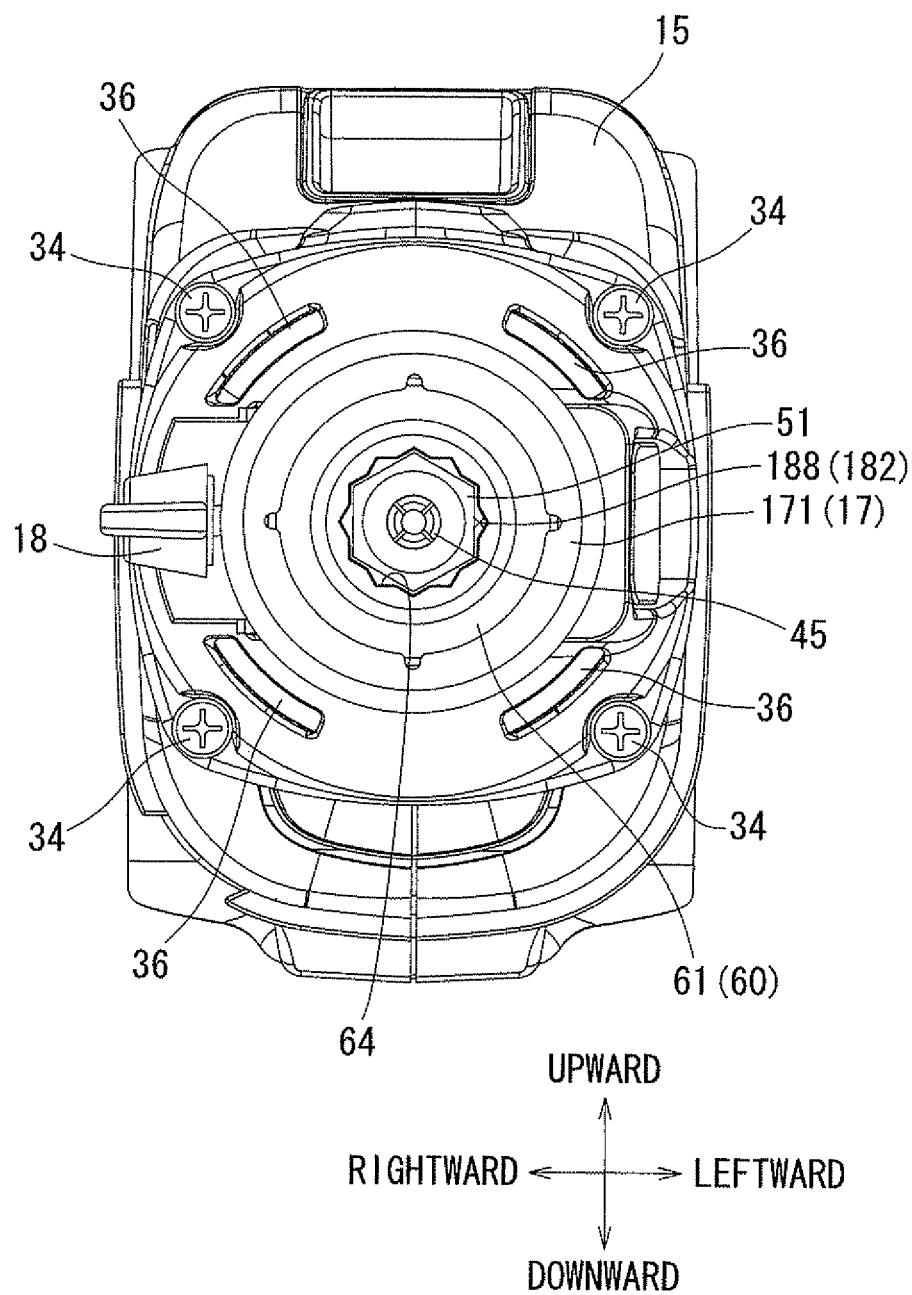
FIG. 16 is a front view of the electric tool.

As shown in FIG. 16, the externally exposed end (front end) of the air passage gap 187 may define the front blow opening 188. The front blow opening 88 serves as a discharge opening for communication between inside and outside of the front housing 31. The front blow opening 188 is opened at the front portion of the front housing 31. More specifically, the front blow opening 188 is positioned between the outer circumferential surface of the nut 51 of the bit mount mechanism 41 and the inner circumferential surface of the engaging member 61 of the operation mechanism 60 as described in connection with the air passage gap 187. The front blow opening 188 is configured such that the air blown out of the front blow opening 188 may flow in the axial direction of the output spindle 35 as shown in FIG. 12. In this way, the air may flow forwardly in the axial direction of the output spindle 35 from the front blow opening 188. This flow direction of air from the front blow opening 188 may be called an externally discharging direction of the air. As shown in FIG. 23, the open area of the front blow opening 188 gradually increases in the forward direction. Therefore, the air blown from the front blow opening 188 may be directed toward the outer circumference of the shoe 17. More specifically, the stream of air blown from the front blow opening 188 may be enlarged outwardly toward the outer circumferential edge 275 of the front portion of the show body 171 (see thick lines (F1)).

According to the electric tool 10 of the above embodiment, the rechargeable battery 15 can be mounted to the battery mount portion 13 as it is slid relative to the battery mount portion 13 in a direction vertically downward perpendicular to the forward and rearward direction. In this way, the rechargeable battery 15 can be mounted as it is slid in the vertical direction that is perpendicular to the forward and rearward direction, along which the major axis (i.e., the axis of the motor housing 21 or the front housing 31) of the electric tool 10 may extend. Therefore, the mounting operation of the rechargeable battery 15 can be easily performed. Hence, the electric tool 10 may be improved in its operability. The sliding direction of the rechargeable battery 15 may not be limited to the vertical direction but may be any of directions perpendicular to the major axis of the electric tool 10 or may be any of directions intersecting the major axis direction.

In addition, the position of the shoe 17 can be changed relative to the tool main body 11 (motor housing 21) by moving the shoe 17 in the forward and rearward direction (first direction). Therefore, the shoe 17 may be configured to extend in the same direction as the extending direction of the front housing 31. Therefore, it may be possible to configure that the electric tool 10 has a relatively small thickness at the region of the shoe 17. Hence, the electric tool 10 may be improved in its operability also in this respect.

Further, the shaft lock mechanism 37 and the finger screw 18 are positioned at positions symmetrical with each other with respect to the central axis of the motor housing 21 that extends in the forward and rearward direction. Therefore, it is possible to reduce the size in the forward and rearward direction of the electric tool 10 at the region around the shaft lock mechanism 37 and the finger screw 18. Hence, it is possible to reduce the length of the electric tool 10. As a result, the electric tool 10 may be improved in its operability also in this respect.

Further, as viewed from the front side or the rear side, the arrangement direction of the shaft lock mechanism 37 and the finger screw 18 is set to be the left and right direction that intersects both the forward and rearward direction and the vertical direction. Therefore, the shaft lock mechanism 37 and the finger screw 18 may be efficiently three-dimensionally arranged. Hence, it is possible to reduce the size of the electric tool 10 at the region around the shaft lock mechanism 37 and the finger screw 18.

Furthermore, with the electric tool 10 of this embodiment, the passage part 182 of the second air flow passage 180 is formed within the front housing 31 that supports the output spindle 35. Therefore, the motor cooling air produced by the fan 29 can be fed along the passage part 182. Because the passage part 182 is configured to guide the air along the axial direction of the output spindle 35, the air may be directed toward the bit mount mechanism 41 and the operation mechanism 60 arranged in association with the output spindle 35. Therefore, the dust may be blown off from these mechanisms (the bit mount mechanism 41 and the operation mechanism 60) before the dust falls on them. Hence, it is possible to ensure that these mechanisms reliably properly operate. In addition, because the dust may be blown in the axial direction of the output spindle 35, it may be possible to prevent dust from accumulation within the front housing 31. Further, the discharge air may be directed toward the bit mount mechanism 41 due to the guide of air between the output spindle 35 and the front housing 31 supporting the output spindle 35. Therefore, the dust may be blown off from the bit mount mechanism 41 before the dust falls on the same. Hence, it is possible to ensure that the bit mount mechanism 41 reliably properly operates also in this respect. Furthermore, because the passage part 182 of the second air flow passage 180 is defined between the outer circumferential surface of the output spindle 35 and the inner circumferential surface of the front housing 31, the dust may be prevented from entering the front housing 31. Therefore, it may be possible to prevent dust from accumulation within the front housing 31 also in this respect. Furthermore, because the air may be directed to the operation mechanism 60 that is provided for operating the bit mount mechanism 41, the dust may be blown off from the operation mechanism 60 before the dust falls on the same. Hence, it is possible to ensure that the operation mechanism 60 reliably properly operates also in this respect.

Furthermore, the front blow opening 188 and the air-blow openings 36 serving as air discharge openings are provided at the front portion of the front housing 31. Because the front blow opening 188 and the air-blow openings 36 are configured such that air flows forwardly from these openings in the axial direction of the output spindle 35, it may be possible to efficiently blow off the dust from a region on the front side of the front housing 31, where the dust is prone to be produced. Therefore, the produced dust may be prevented from accumulation. Hence, it may be possible to prevent the dust from accumulation. As a result it is possible to reduce an uncomfortable feeling given to the operator by the dust. Eventually, the operator can comfortably use the electric tool 10.

Furthermore, the air blown from the front blow opening 188 and the air blown from the air-blow openings 36 may flow through points around the outer circumferential edge 275 of the front portion of the shoe body 171 of the shoe 17. Therefore, the dust produced during the use of the electric tool 10 may be blown toward the outer circumferential side of the shoe body 171. Hence, the dust may not be flown toward the operator. As a result it is possible to reduce an uncomfortable feeling given to the operator by the dust. Eventually, the operator can comfortably use the electric tool 10 also in this respect. More specifically, as indicated by thick lines (F1) in FIGS. 12 and 23, the air blown from the front blow opening 188 may flow through points near and inside of the outer circumferential edge 275 of the front portion of the shoe body 171 of the shoe 17. Therefore, it may be possible to blow the dust toward the outer circumferential side of the shoe body 171. In addition, as indicated by thick lines (F2) in FIGS. 12 and 23, the air blown from the four air-blow openings 36 disposed at the front portion of the front housing 31 may flow through points near and outside of the outer circumferential edge 275 of the front portion of the shoe body 171 of the shoe 17 in such a manner that the air streams are curved radially outward around the outer circumferential edge 275. Therefore, it may be possible to blow the dust toward the outer circumferential side of the shoe body 171 with a large force. Hence, the operator can easily perform the operation of the electric tool 10.

<Second Embodiment>

Figure 24:
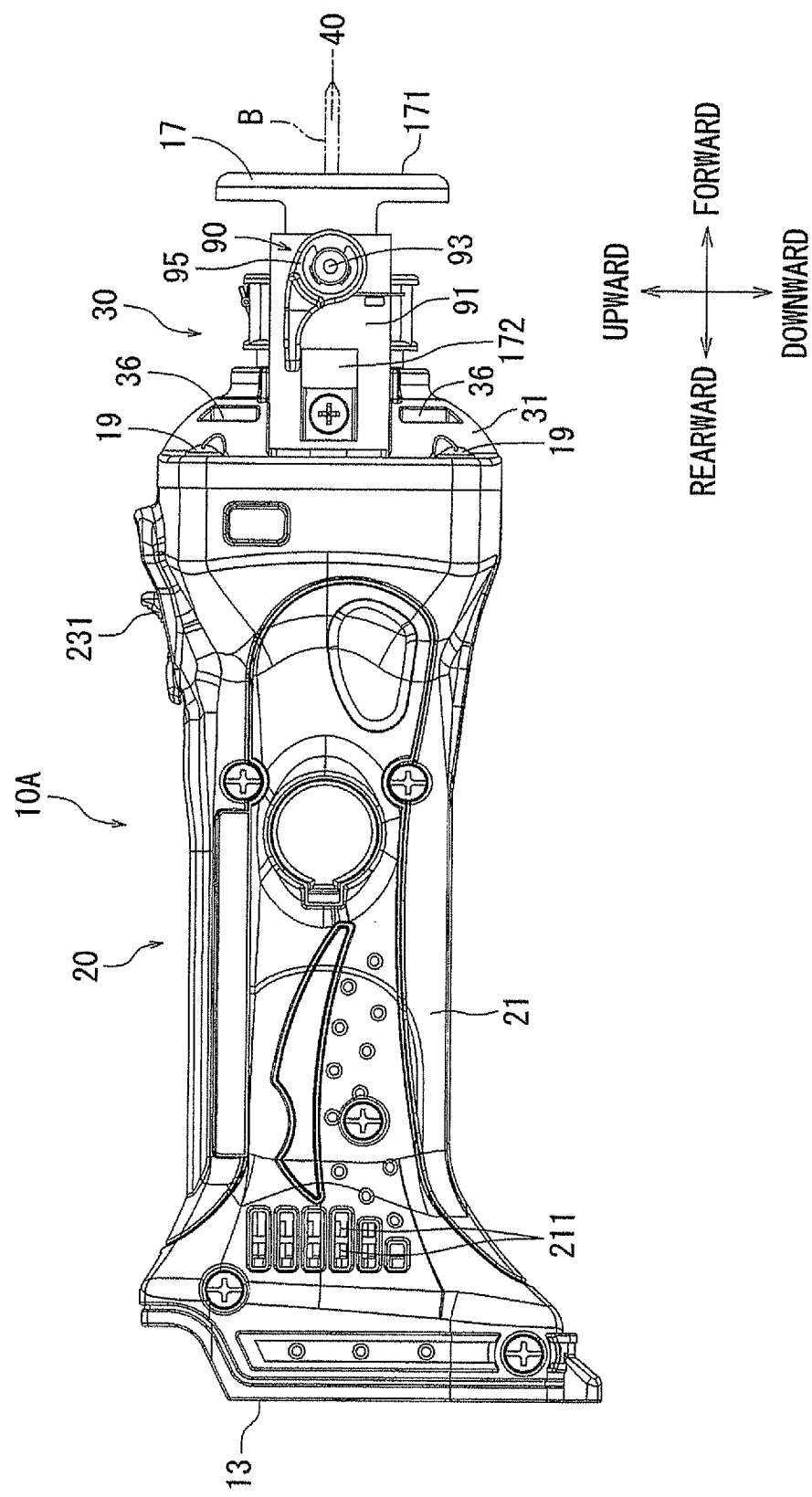
FIG. 24 is a side view of an electric tool according to a second embodiment.

A second embodiment will now be described with reference to FIGS. 24 to 29. FIG. 24 shows a side view of an electric tool 10A according to the second embodiment. The electric tool 10A is different from the electric tool 10 of the first embodiment in the construction for fixing the shoe 17 in position. In the case of the first embodiment, as the finger screw 18 is rotated in the tightening direction, the mount portion 172 of the shoe 17 may be pressed against the guide member 174, so that the mount portion 172 of the shoe 17 may be fixed in position relative to the guide member 174 by the finger screw 18. In this way, the shoe 17 can be fixed in position relative to the tool main body 11. In contrast, in the second embodiment, the shoe 17 can be fixed in position relative to the tool main body 11 by using a one-touch fixing mechanism 90. The one-touch fixing mechanism 90 is configured to be able to fix the shoe 17 relative to the front housing 31 by a one touch action (i.e., a single operation) of the operator.

The electric tool 10A of the second embodiment is different from the electric tool 10 of the first embodiment in that the finger screw 18 and its related construction are replaced with the one-touch fixing mechanism 90. In other respect, the construction of the electric tool 10A may be the same as the electric tool 10. Therefore, in FIGS. 24 to 29, like members are given the same reference numerals as the first embodiment and the description of these members will not be repeated.

As shown in FIGS. 24 to 29, the one-touch fixing mechanism 90 generally includes a fixed guide plate 91, a fixing screw 93, an operation lever 95 and a biasing spring 97. Similar to the guide member 174 of the first embodiment, the fixed guide plate 91 is fixed to the front housing 31 by means of screws. The fixed guide plate 91 is positioned to surround the mount portion 172 of the shoe 17 in a manner similar to the guide member 174. The mount portion 172 of the shoe 17 can slide in the forward and rearward direction under the guide of the fixed guide plate 91. The fixing screw 93 is threadably engaged with a threaded hole 92 formed in the fixed guide plate 91. The operation lever 95 is attached to the fixing screw 93 so as to be integrated therewith. Therefore, as the operation lever 95 is rotated, the fixing screw 93 rotates together with operation lever 95. The biasing spring 97 is interposed between the operation lever 95 and the fixed guide plate 91 to normally bias the operation lever 95 in a releasing direction to rotate the fixing screw 93 in a loosening direction. As the fixing screw 93 rotates in the loosening direction, the fixing screw 93 moves away from the mount portion 172.

Figure 25:
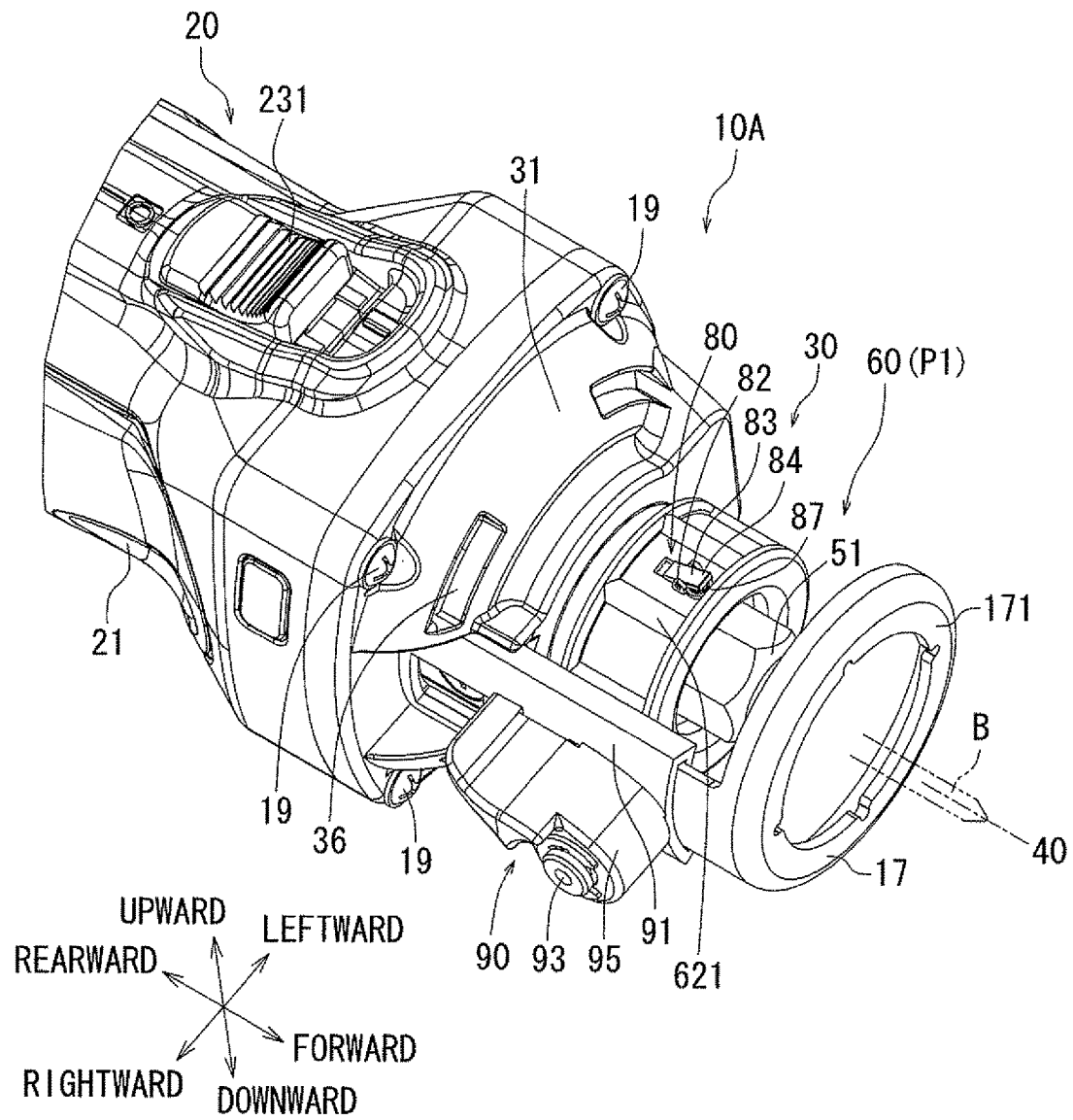
FIG. 25 is an enlarged perspective view of the electric tool shown in FIG. 24.
Figure 26:
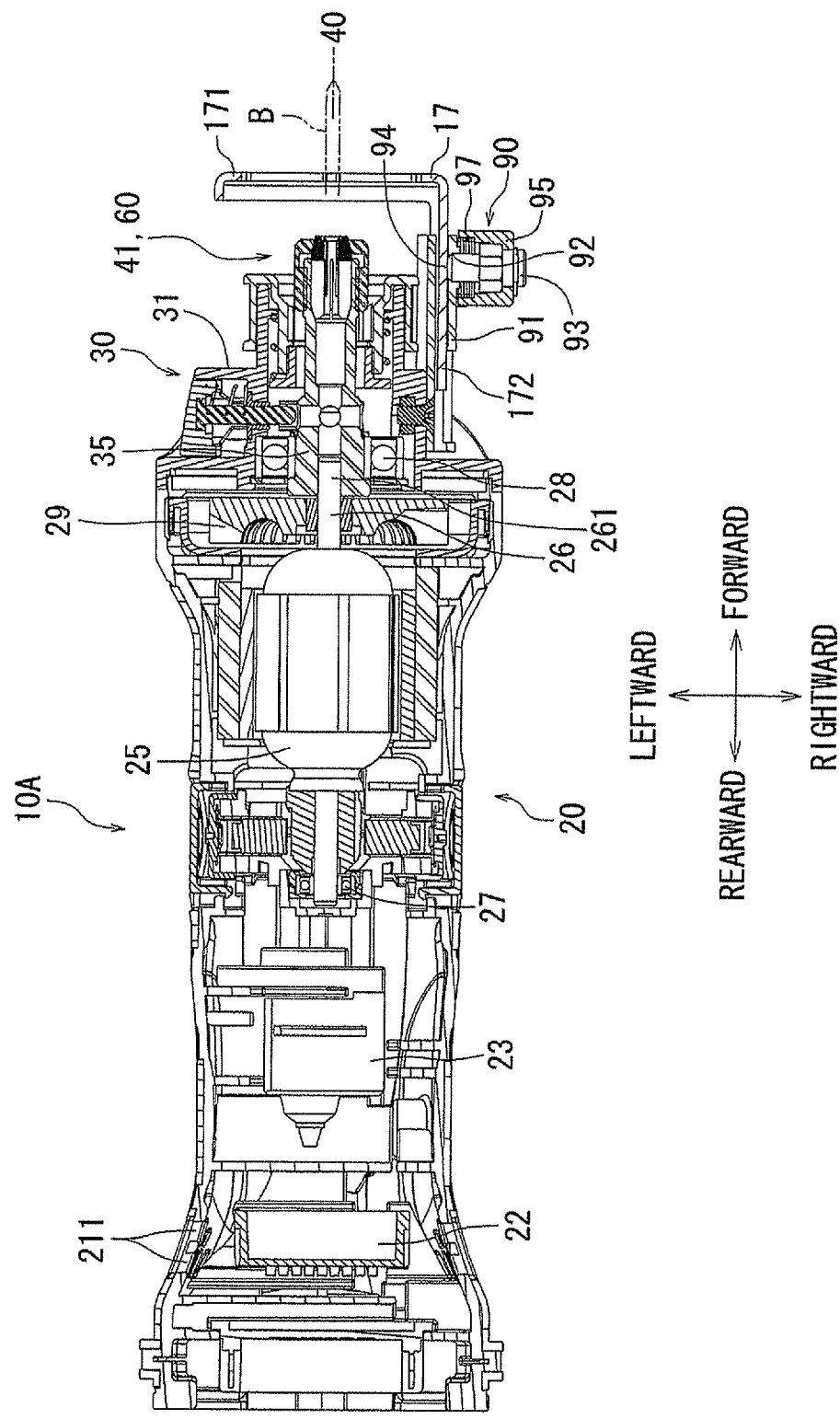
FIG. 26 is a horizontal sectional view of the electric tool shown in FIG. 24.
Figure 27:
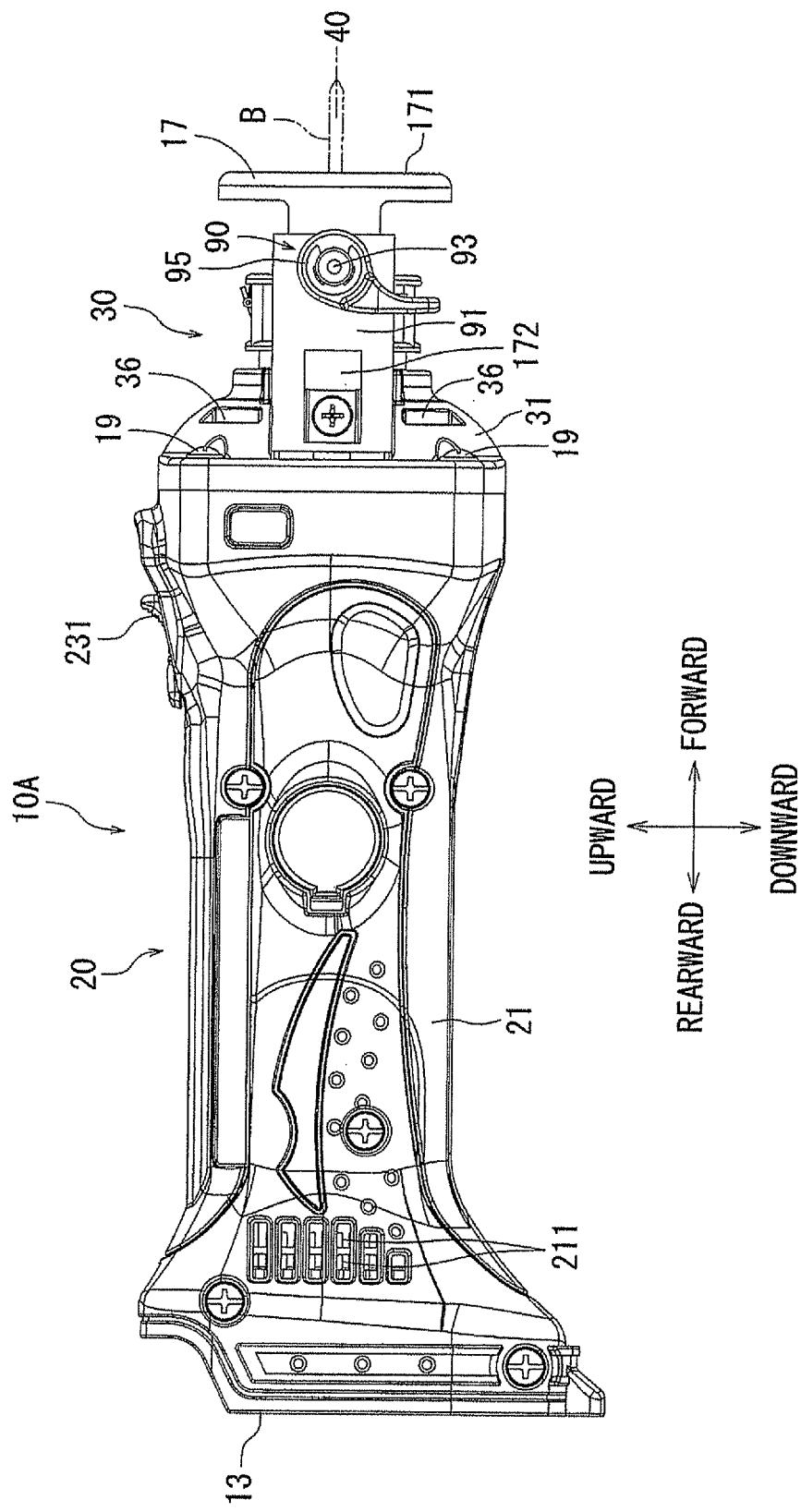
FIG. 27 is a view similar to FIG. 24 but showing the state where the fixation of a shoe has been released.
Figure 28:
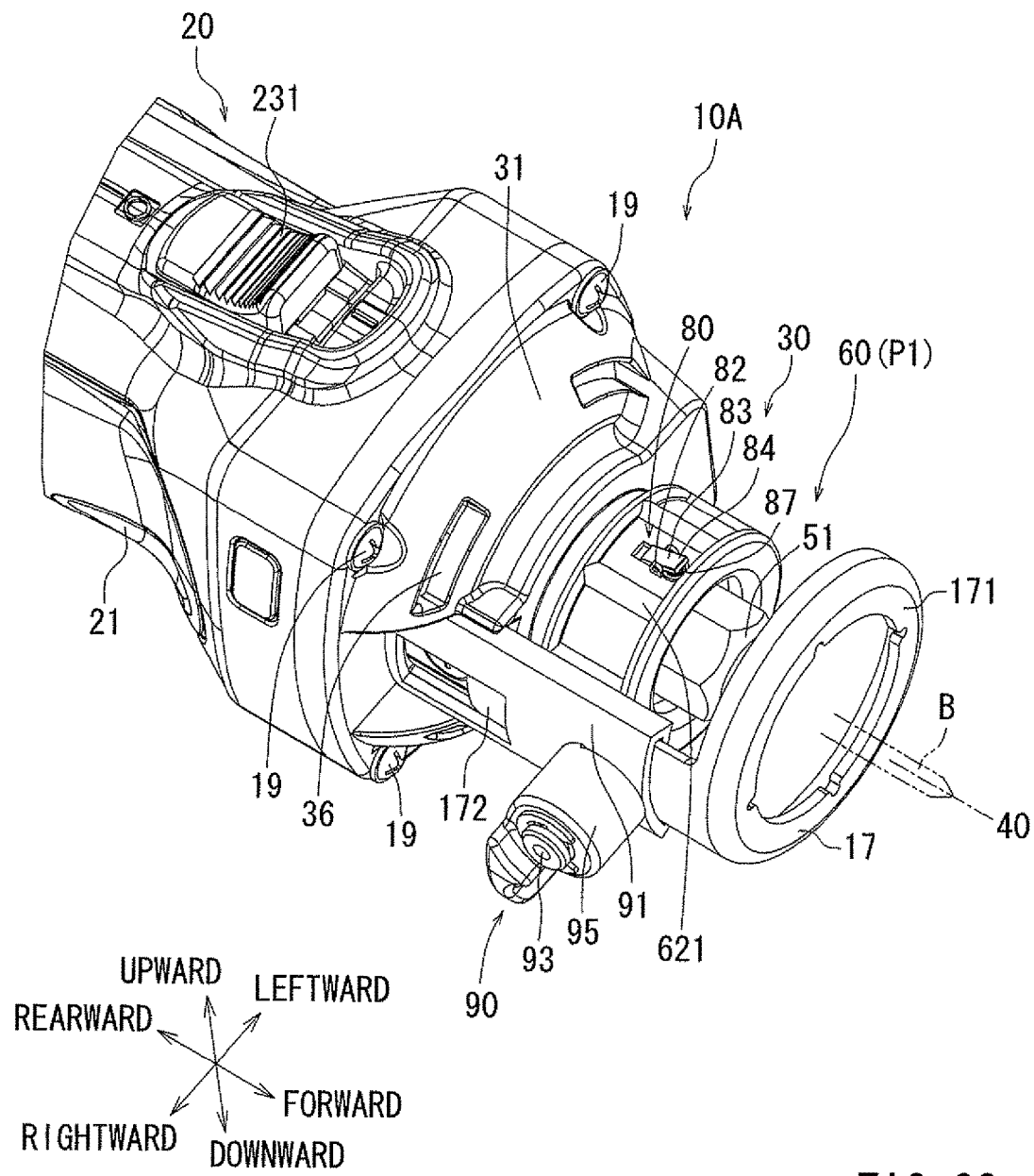
FIG. 28 is a view similar to FIG. 25 but showing the state where the fixation of the shoe has been released.
Figure 29:
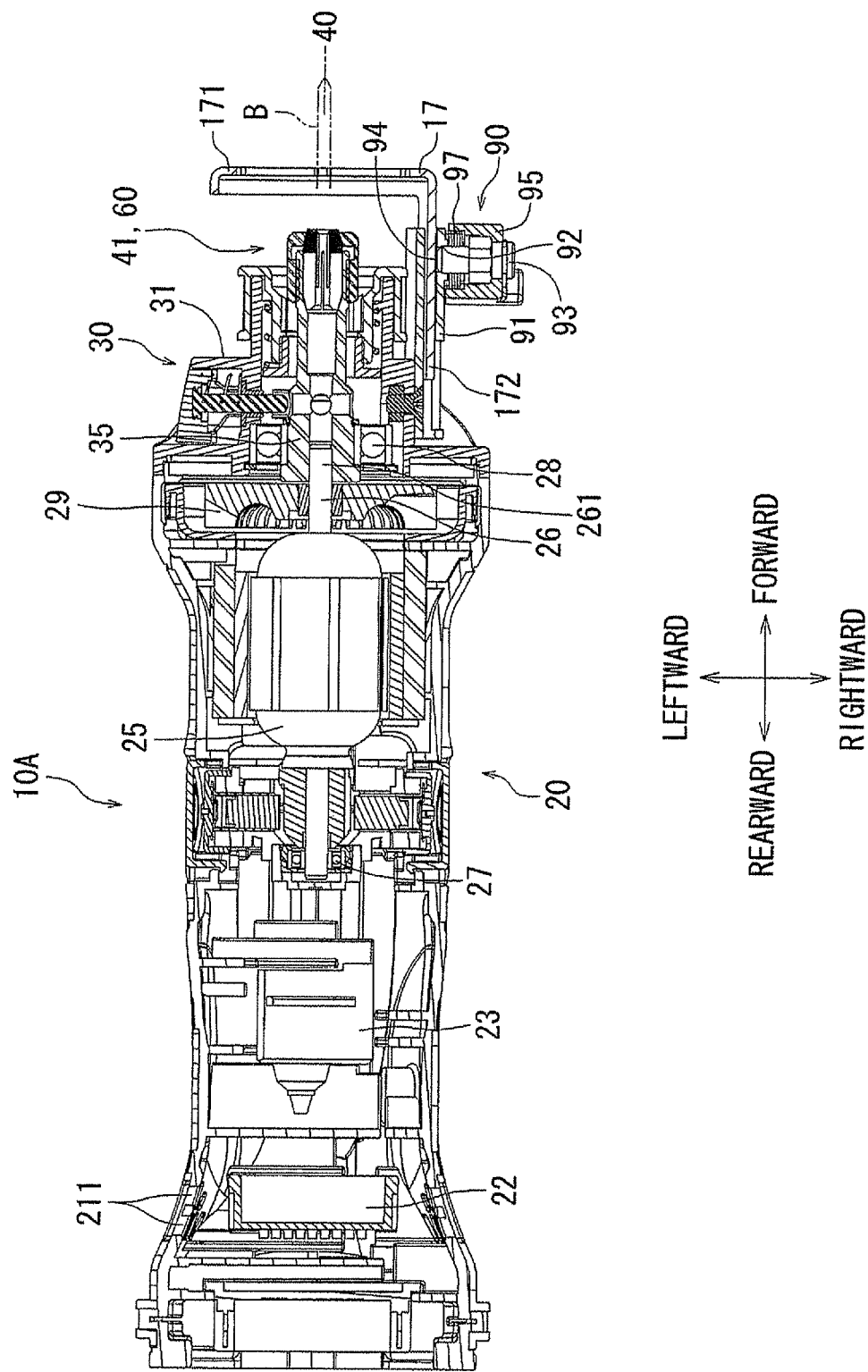
FIG. 29 is a view similar to FIG. 26 but showing the state where the fixation of the shoe has been released.

When the operator rotates the operation lever 95 in a fixing direction to rotate the fixing screw 93 in a tightening direction opposite to the loosening direction, the fixing screw 93 moves toward the mount portion 172, so that a pressing end 94 of the fixing screw 93 protrudes inwardly from the threaded hole 92 as shown in FIGS. 24 to 26. Then, the pressing end 94 of the fixing screw 93 may be pressed against the outer surface of the mount portion 172, so that the mount portion 172 may be fixed in position relative to the fixed guide plate 91. In this way, the one-touch fixing mechanism 90 can fix the shoe 17 in position relative to the tool man body 11 by the one-touch operation (single operation) of the operation lever 95.

On the other hand, when the operator operates the operation lever 95 to rotate the same in the releasing direction that is the same direction as the biasing direction of the biasing spring 97, the operation lever 95 may rotate in the releasing direction while receiving the biasing force of the biasing spring 97 in the same direction, so that the fixing screw 93 rotates in the loosening direction relative to the threaded hole 92. Therefore, the pressing end 94 of the fixing screw 93 moves away from the mount portion 172 of the shoe 17. Hence, the mount portion 172 of the shoe 17 may be released from fixation relative to the fixed guide plate 91 and can be moved in the forward and rearward direction relative to the front housing 31. In this way, with the one-touch fixing mechanism 90, the operation for releasing fixation of the shoe 17 can be made by the one-touch operation (single operation) of the operation lever 95.

With the electric tool 10A according to the second embodiment, the shoe 17 movable relative to the tool man body 11 (front housing 31) can be fixed in position relative to the tool main body 11 (front housing 31) by the one-touch operation of the one-touch fixing mechanism 90. Therefore, after adjustment of the position of the shoe 17, the shoe 17 can be fixed in position by the one-touch operation. Hence, the position fixing operation of the shoe 17 can be easily performed. The electric tool 10A is improved in the operability in this respect.

<Third Embodiment>

Figure 30:
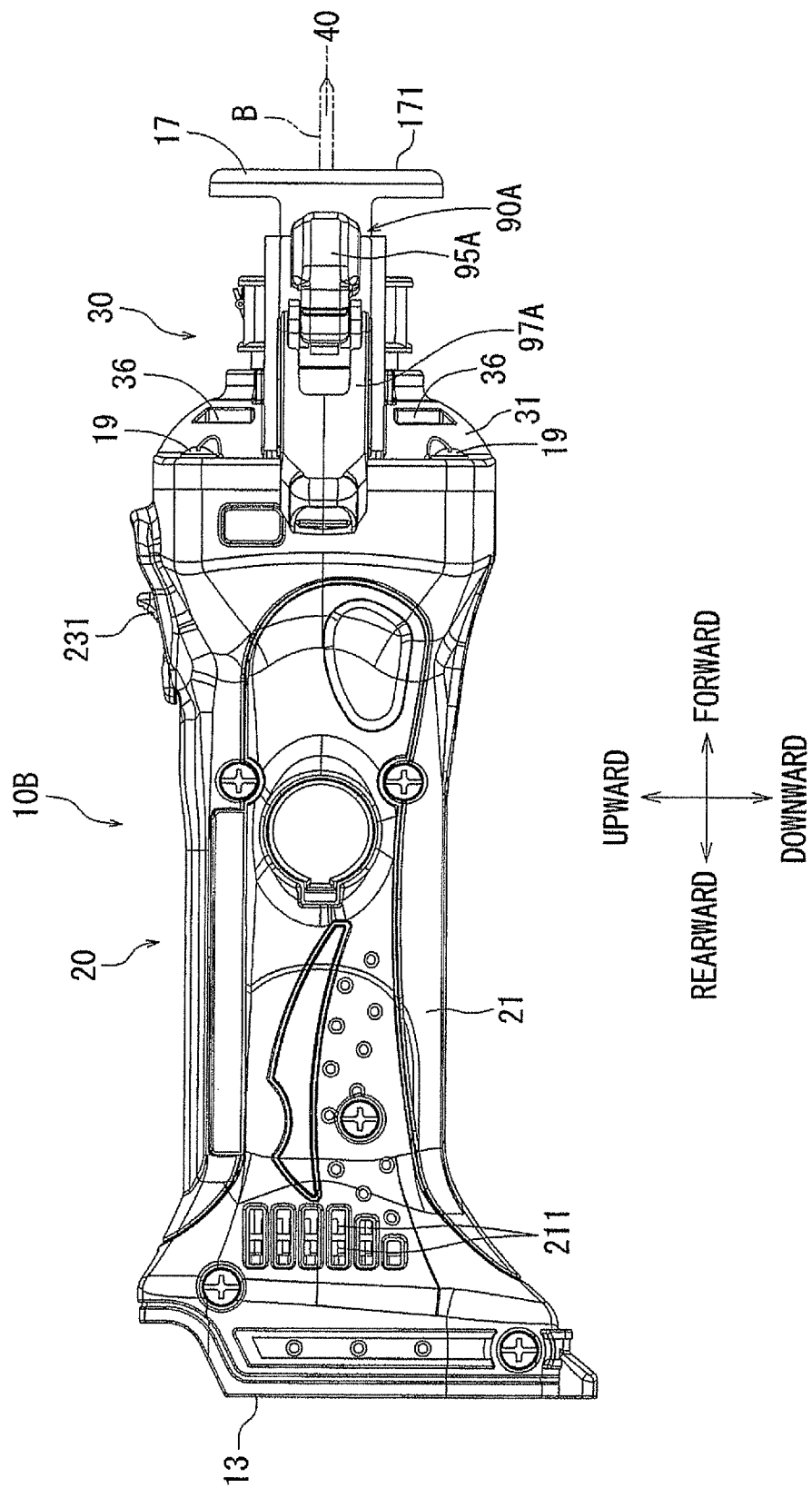
FIG. 30 is a side view of an electric tool according to a third embodiment.
Figure 31:
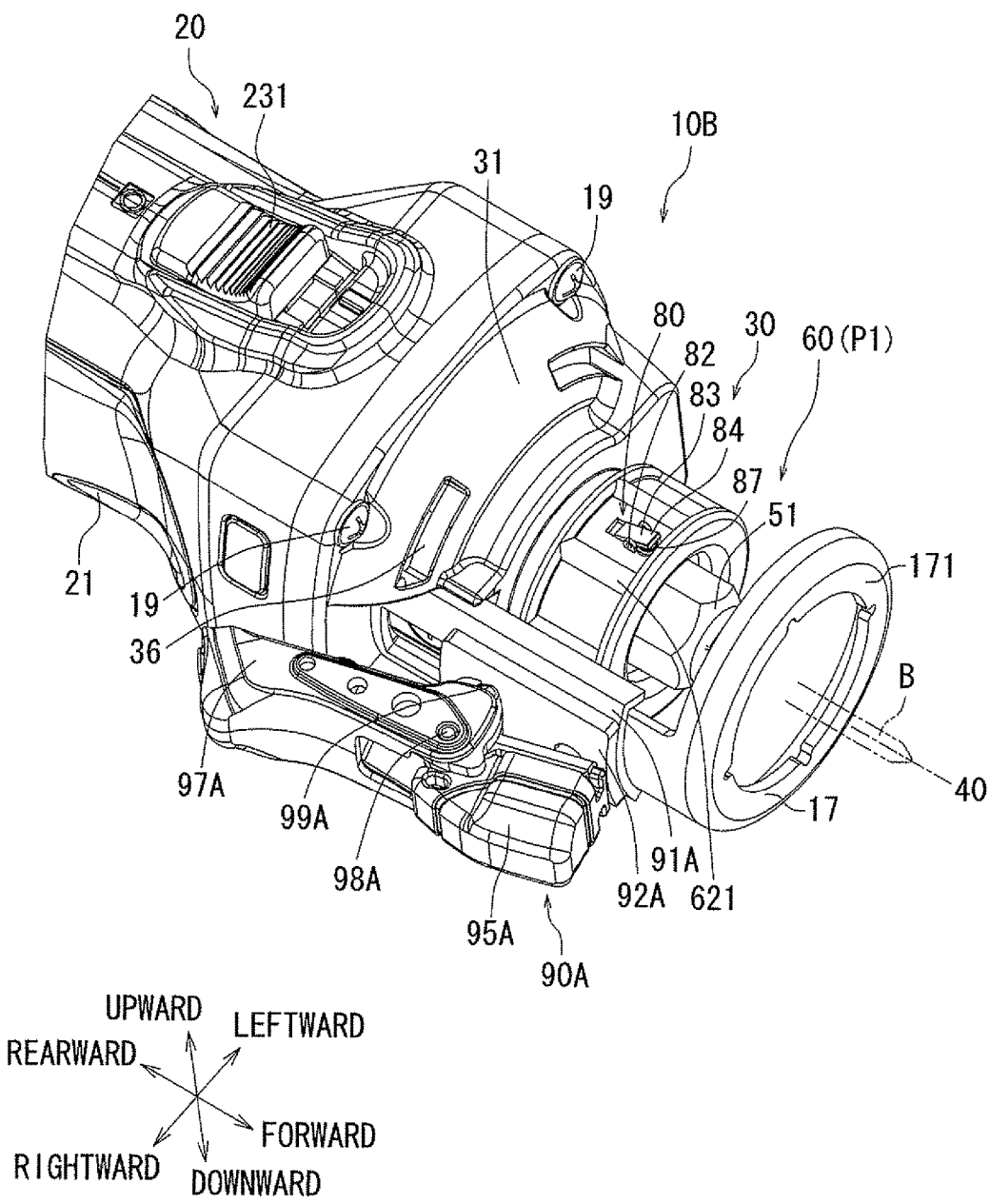
FIG. 31 is an enlarged perspective view of the electric tool shown in FIG. 30.

A third embodiment will now be described with reference to FIGS. 30 to 35. FIG. 30 shows an electric tool 10B according to the third embodiment. The electric tool 10B is different from the electric tool 10A of the second embodiment in that the one-touch fixing mechanism 90 is replaced with a one-touch fixing mechanism 90A that utilizes a toggle mechanism. Thus, the electric tool 10B includes the one-tough fixing mechanism 90A that utilizes a toggle mechanism for fixing the shoe 17 in position relative to the tool main body 11. Therefore, the one-touch fixing mechanism 90A serves as a shoe fixing device. Also, the one-touch fixing mechanism 90A is configured to be able to fix the shoe 17 by the one-touch operation (single operation) of the operator.

The electric tool 10B of the third embodiment may be the same as the electric tool 10A of the second embodiment except for the replacement of the one-touch fixing mechanism 90 with the one-touch fixing mechanism 90A. Therefore, in FIGS. 30 to 35, like members are given the same reference numerals as the first and second embodiments and the description of these members will not be repeated.

Referring to FIGS. 30 to 35, the one-touch fixing mechanism 90A generally includes a fixed guide plate 91A, a fastening clamp 93A, a clamp retainer 95A and a toggle operation lever 97A.

The fixed guide plate 91A may be configured to be the same as the fixed guide plate 91 of the second embodiment and may be fixed to the front housing 31 by means of screws. The fixed guide plate 91A also may be positioned to surround the mount portion 172 of the shoe 17. Also, the mount portion 172 of the shoe 17 can slide in the forward and rearward direction under the guide of the fixed guide plate 91A. A roller guide plate 92A is attached to the outer side of the fixed guide plate 91A. A toggle roller 99A that will be explained later can roll on the roller guide plate 92A. The fastening clamp 93A has a substantially bar-like shape. One end (the outer end or the lower end in FIG. 32) of the fastening clamp 93A is held by the clamp retainer 95A, and the other end (inner end or the upper end in FIG. 32) of the fastening clamp 93A may contact the inner surface of the mount portion 172. An enlarged engaging flange 94A is formed on the inner end of the fastening clamp 93A. In this connection, a slot having a width smaller than the engaging flange 94A and larger than the clamp retainer 95A is formed in the mount portion 172. The fastening clamp 93A may be inserted into the slot formed in the mount portion 172 from the upper side as viewed in FIG. 32, so that the enlarged engaging flange 94A may contact the inner surface of the mount portion 172 around the slot. Therefore, when the fastening clamp 93A moves outward (rightward), the fastening clamp 93A may pull the mount portion 172 outward (rightward). The outer end of the fastening clamp 93A threadably engages a nut 96A that is held by the clamp retainer 95A. In this way, the outer end of the fastening clamp 93A may be held by the clamp retainer 95A. A support shaft 98A is supported on the rear portion of the clamp retainer 95A. The support shaft 98A pivotally supports the toggle operation lever 97A. In addition, the toggle roller 99A is supported on the clamp retainer 95A at a position on the left side of the pivotal shaft 98A. As the toggle operation lever 97A is operated, the toggle roller 99A may roll on the roller guide plate 92A, so that the toggle roller 99A can change its position. Depending on the distance between the toggle roller 99A and the support shaft 98A, the fastening clamp 93A may be forced to move outward or may not be forced to move outward.

Figure 32:
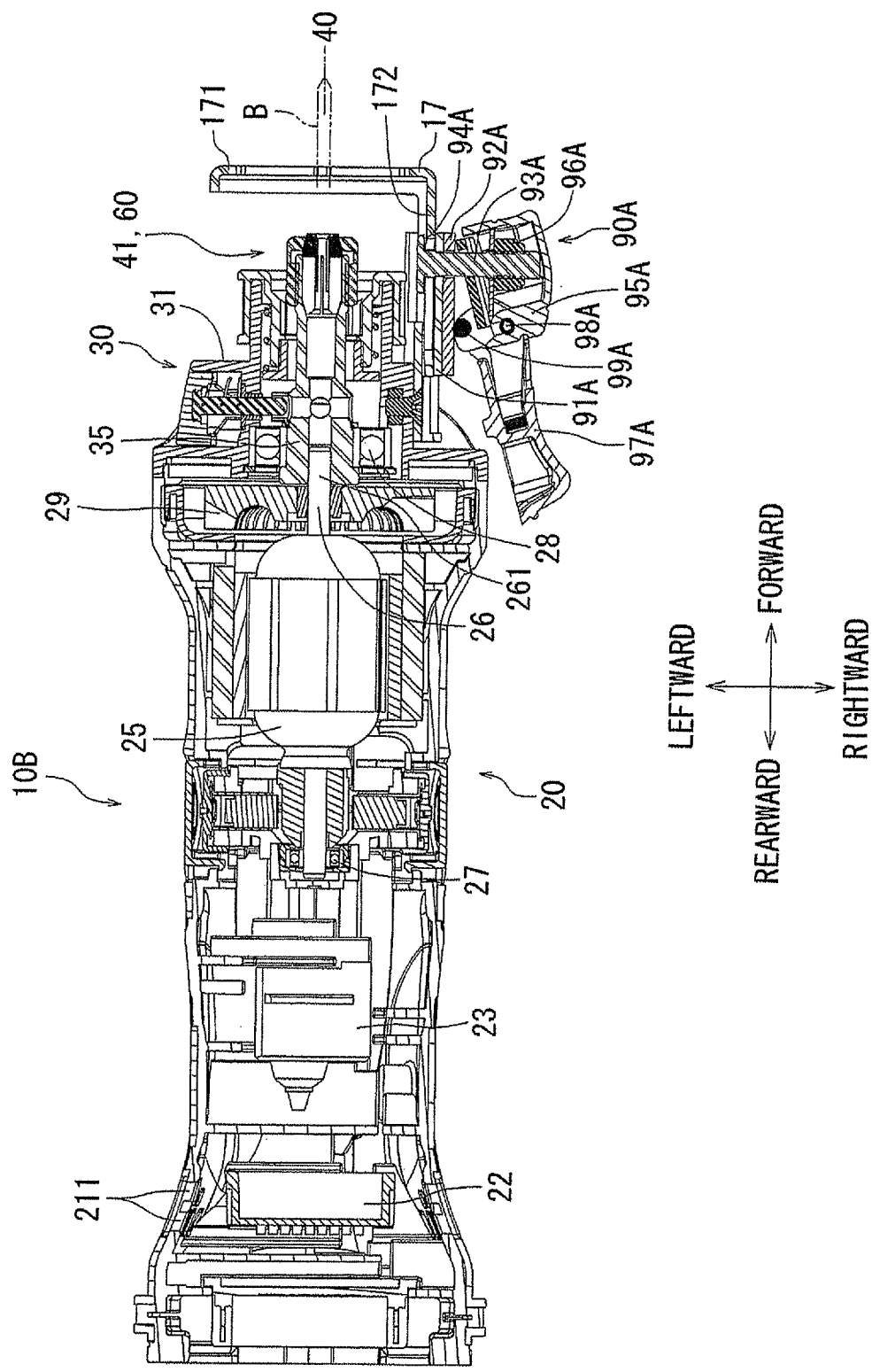
FIG. 32 is a horizontal sectional view of the electric tool shown in FIG. 30.
Figure 33:
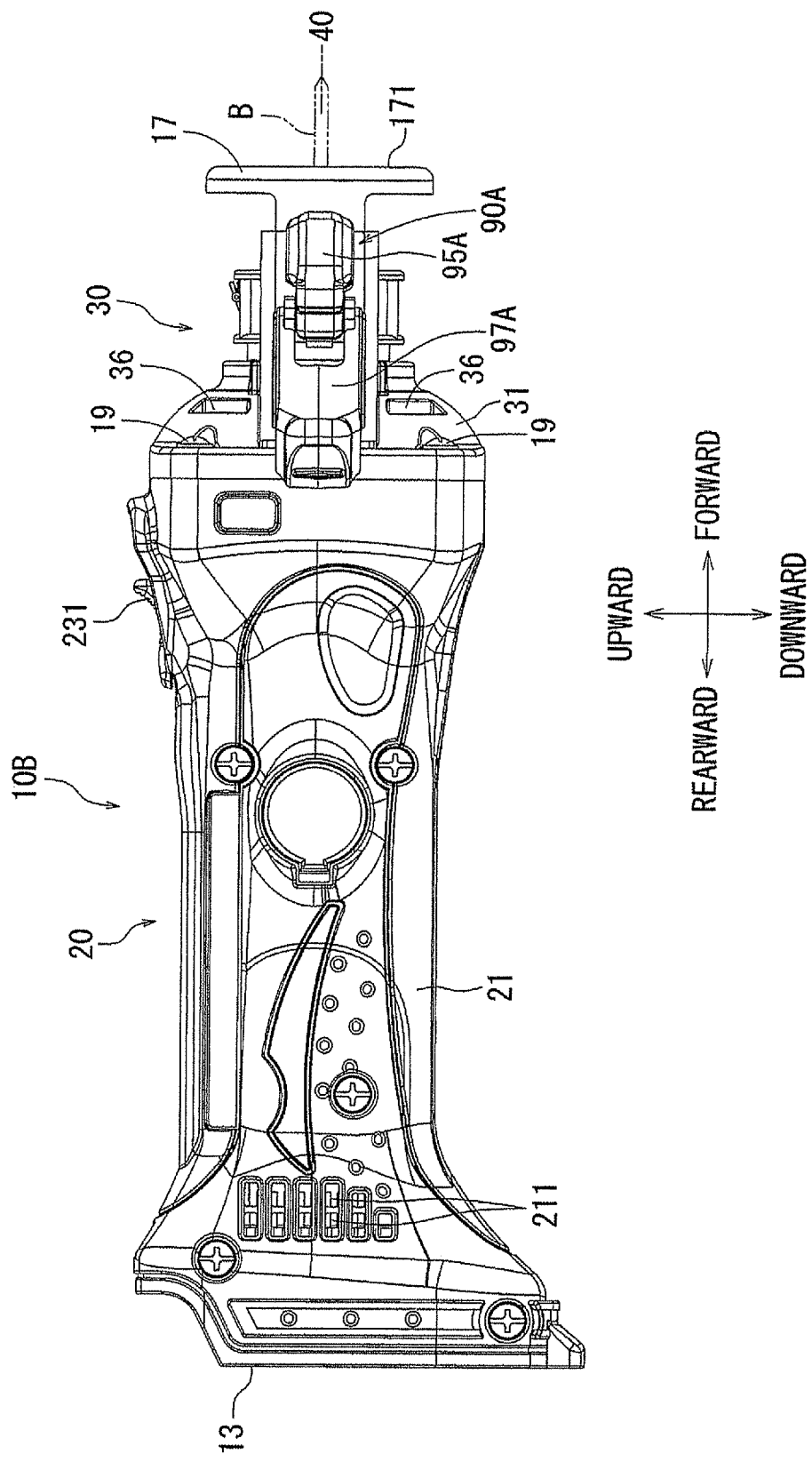
FIG. 33 is a view similar to FIG. 30 but showing the state where the fixation of a shoe has been released.
Figure 35:
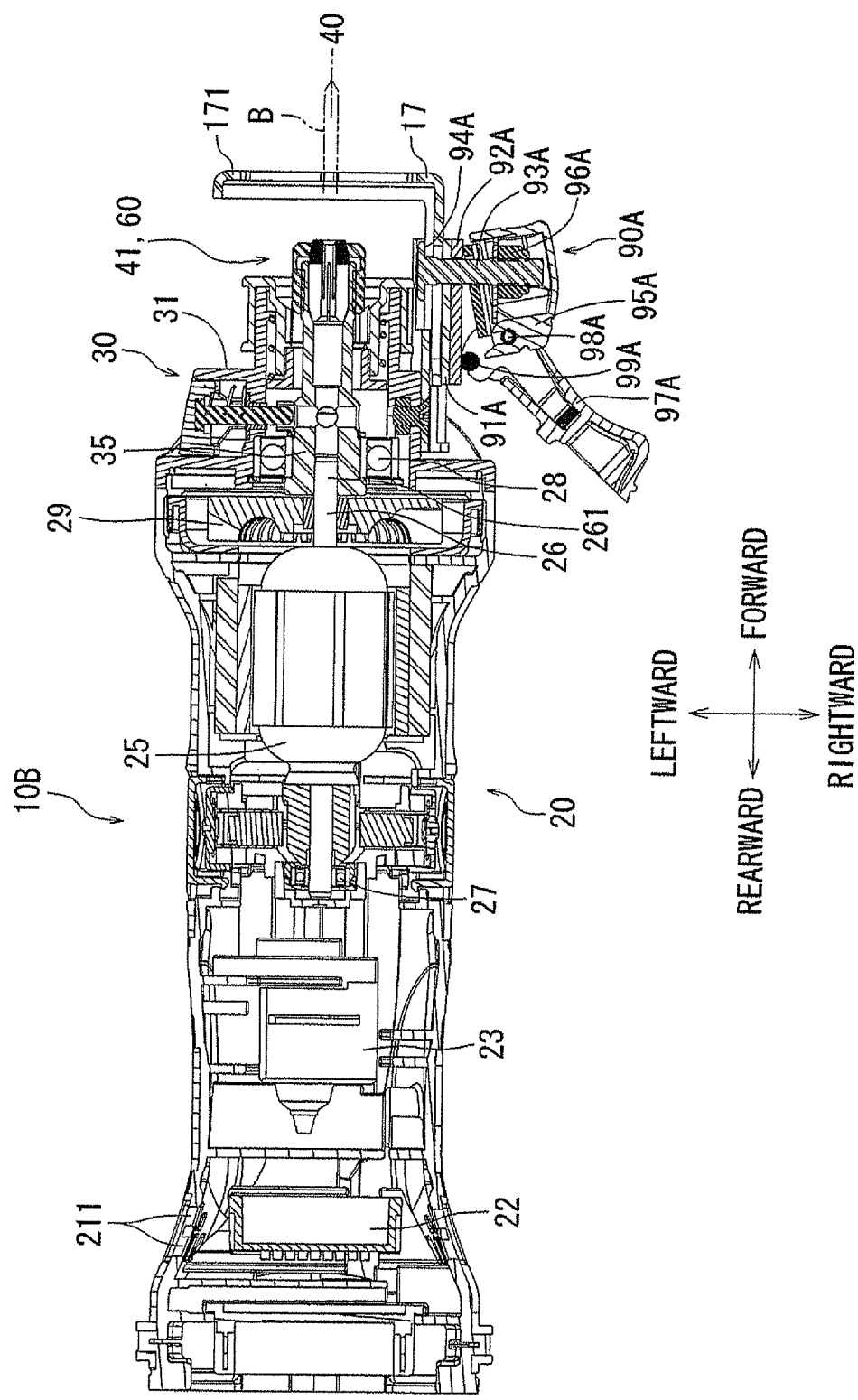
FIG. 35 is a view similar to FIG. 32 but showing the state where the fixation of the shoe has been released.

More specifically, as the toggle operation lever 97A is pushed inward (leftward) from the position shown in FIG. 35, the toggle roller 99A rolls on the roller guide plate 92A so as to move forward, so that the distance between the toggle roller 99A and the support shaft 98A measured along the left and right direction may increase. Therefore, the fastening clamp 93A is pulled outward (rightward). Then, the engaging flange 94A provided on the inner end (left end) of the fastening clamp 93A is forced to be pressed against the mount portion 172 of the shoe 17, so that the mount portion 172 of the shoe 17 may be pressed against the fixed guide plate 91A as shown in FIG. 32. In this way, the shoe 17 can be fixed in position relative to the fixed guide plate 91A and eventually relative to the tool main body 11. As a result, with the one-touch fixing mechanism 90A, the shoe 17 can be fixed in position by the one-touch operation (single operation) of the toggle operation lever 97A after the position of the shoe 17 relative to the tool main body 11 has been adjusted or determined.

On the other hand, as the toggle operation lever 97A is pulled outward (rightward) from the position shown in FIG. 32, the toggle roller 99A rolls on the roller guide plate 92A so as to move rearward, so that the distance between the toggle roller 99A and the support shaft 98A measured along the left and right direction may decrease. Therefore, the engaging flange 94A provided on the inner end (left end) of the fastening clamp 93A may not be pressed against the mount portion 172 of the shoe 17, so that the mount portion 172 of the shoe 172 may not be pressed against the fixed guide plate 91A as shown in FIG. 35. In this way, the fixation of the mount portion 172 of the shoe 17 against the fixed guide plate 91A may be released. Therefore, the shoe 17 may be free to move in the forward and rearward direction. As a result, with the one-touch fixing mechanism 90A, the fixation of the shoe 17 can be released by the one-touch operation (single operation) of the toggle operation lever 97A.

Thus, also with the electric tool 10B according to the third embodiment, the shoe 17 movable relative to the tool man body 11 (front housing 31) can be fixed in position relative to the tool main body 11 (front housing 31) by the one-touch operation of the one-touch fixing mechanism 90A. Therefore, after adjustment of the position of the shoe 17, the shoe 17 can be fixed in position by the one-touch operation. Hence, the position fixing operation of the shoe 17 can be easily performed. The electric tool 10B is improved in the operability in this respect.

<Other Possible Modifications>

The above embodiments may be modified in various ways. For example, although the electric tools of the above embodiments have been configured as those called dust-proof board trimmers or cut-out tools, the above teachings may be also applied to any other electric tools as long as they have bit mounting mechanisms.

Further, the shoe 17 and the shoe fixing devices (the finger screw 18 and the one-touch fixing mechanisms 90 and 90A) may not be limited to those described above and may have any other configurations than those descried in the embodiments.

Further, in the above embodiments, the air is discharged to the out side from the front blow opening 188 and also from the four air-blow openings 36 disposed at the front portion of the tool man body 11. However, the above embodiments may be modified not to include the four air-blow openings 36. In this case, the electric tool has only the front blow opening 188.

What is claimed is:
1. An electric tool configured to actuate an end tool, the electric tool comprising:
   a motor configured to generate a rotational drive force;
   an output shaft rotatably driven by the rotational drive force of the motor and having a longitudinal axis;
   a fan configured to rotate with the output shaft around the longitudinal axis in order to produce a cooling air flow;
   a support housing configured to support and house the output shaft, the motor and the fan;
   a controller configured to control an operation of the motor, the controller disposed within the support housing;
   a tool holder disposed at a front portion of the output shaft and configured to hold the end tool;
   an adjustment base disposed on a front side of a front end of the output shaft and capable of adjusting a machining range of the end tool;
   an air flow passage defined in the support housing, so that air flows in an axial direction along the longitudinal axis; wherein:

the controller and motor are oriented on one side of the fan, and the tool holder and adjustment base are oriented on an opposite side of the fan;

the air flow passage comprises:

a suction air flow passage providing suction air by the fan, defined by a path between an inlet opening formed in the support housing and the fan, and a discharge air flow passage providing discharge air by the fan, defined between the fan and a discharge opening along the longitudinal axis;

the controller and the motor are disposed in the suction air flow passage; and at least a part of the discharge air produced by the fan is discharged from the discharge opening of the discharge air flow passage axially along the longitudinal axis and directed at the adjustment base.

2. The electric tool according to claim 1, wherein:

the discharge opening is formed in the support housing and comprises a first discharge opening and a second discharge opening;

the electric tool further comprises a shaft lock mechanism configured to lock the output shaft for preventing rotation of the output shaft in the rotational direction;

the first discharge opening and the second discharge opening are located at different positions from each other in a front-to-rear direction along the axial direction; and the shaft lock mechanism is located between the first discharge opening and the second discharge opening in the front-to-rear direction.

3. The electric tool according to claim 1, wherein:

the discharge opening is formed in the support housing and comprises a first discharge opening and a second discharge opening;

the first discharge opening and the second discharge opening are located at different positions from each other in a front-to-rear direction along the axial direction;

the adjustment base comprises a mount portion mounted to and supported by the support housing; and the mount portion is located between the first discharge opening and the second discharge opening in the front-to-rear direction.

4. The electric tool according to claim 1, wherein:

a second part of the discharge air flows directly by an outer circumference of the tool holder.

5. The electric tool according to claim 1, wherein:

the discharge opening is formed in the support housing and comprises a first discharge opening and a second discharge opening; and the second discharge opening is configured to discharge air that flows directly by an outer circumference of the tool holder.

6. The electric tool according to claim 1, wherein the tool holder is disposed in the discharge air flow passage.

7. The electric tool according to claim 1, further comprising a rechargeable battery configured to be detachably mounted to the support housing.

8. The electric tool according to claim 7, wherein the rechargeable battery is further configured to be mounted to and detached from the support housing as it is slid along the support housing in a direction perpendicular to the longitudinal axis.

9. The electric tool according to claim 1, wherein:

a second part of the discharge air flows directly by an outer circumference of the tool holder and/or directly through an inside of the tool holder.

10. The electric tool according to claim 1, wherein:

the discharge opening is formed in the support housing and comprises a first discharge opening and a second discharge opening; and the second discharge opening is configured to discharge air that flows directly by an outer circumference of the tool holder and/or directly through an inside of the tool holder.

* * * * *